United States Patent
Macaulay et al.

(10) Patent No.: US 9,710,473 B2
(45) Date of Patent: Jul. 18, 2017

(54) METHOD FOR MANAGING PERSONALIZED PLAYING LISTS OF THE TYPE COMPRISING A URL TEMPLATE AND A LIST OF SEGMENT IDENTIFIERS

(71) Applicant: ENVIVIO FRANCE, Saint Jacques de la Lande (FR)

(72) Inventors: Alexander Macaulay, Saint-Aubin-sur-Mer (FR); Alain Leal, Chanteloup (FR)

(73) Assignee: ENVIVIO FRANCE, Saint Jacques de la Lande (FR)

( * ) Notice: Subject to any disclaimer, the term of this patent is extended or adjusted under 35 U.S.C. 154(b) by 206 days.

(21) Appl. No.: 14/281,560

(22) Filed: May 19, 2014

(65) Prior Publication Data

US 2014/0365491 A1    Dec. 11, 2014

(30) Foreign Application Priority Data

May 17, 2013  (FR) ...................................... 13 54503

(51) Int. Cl.
    G06F 17/30   (2006.01)
    H04L 29/06   (2006.01)
    H04L 12/28   (2006.01)

(52) U.S. Cl.
    CPC .... G06F 17/30053 (2013.01); H04L 12/2812 (2013.01); H04L 12/2834 (2013.01);
    (Continued)

(58) Field of Classification Search
    CPC ......... G06F 17/30053; G06F 17/30244; G06F 17/30781; G06F 17/30017; G06F 17/3074;
    (Continued)

(56) References Cited

U.S. PATENT DOCUMENTS

| | | | |
|---|---|---|---|
| 2006/0020609 A1* | 1/2006 | LaChapelle et al. | 707/100 |
| 2012/0290644 A1 | 11/2012 | Gabin et al. | |
| 2013/0111529 A1* | 5/2013 | Yao et al. | 725/93 |

FOREIGN PATENT DOCUMENTS

WO    2013033565 A1    3/2013

OTHER PUBLICATIONS

Youngkwon Lim et al., MMT: An Emerging MPEG Standard for Multimedia Delivery over the Internet, 2013, vol. 20, IEEE, 80-81.*

(Continued)

*Primary Examiner* — Jean B Fleurantin
(74) *Attorney, Agent, or Firm* — David D. Brush; Westman, Champlin & Koehler, P.A.

(57) ABSTRACT

A first splicer manages a get-list request coming from a player and parameterized with an identifier of a first content and a group identifier. The first splicer obtains an initial playlist having a first URI template, pointing towards a first server and pre-parameterized with the identifier of the first content, and a first list of segment identifiers. The first splicer builds and transmits a final playlist to the player including a second URI template, pointing to a second splicer and pre-parameterized with the identifier of the first content and the group identifier, and a second list of virtual segment identifiers. Each virtual segment is associated with a segment of the first content or of an alternative content.

18 Claims, 17 Drawing Sheets

Figure 1:
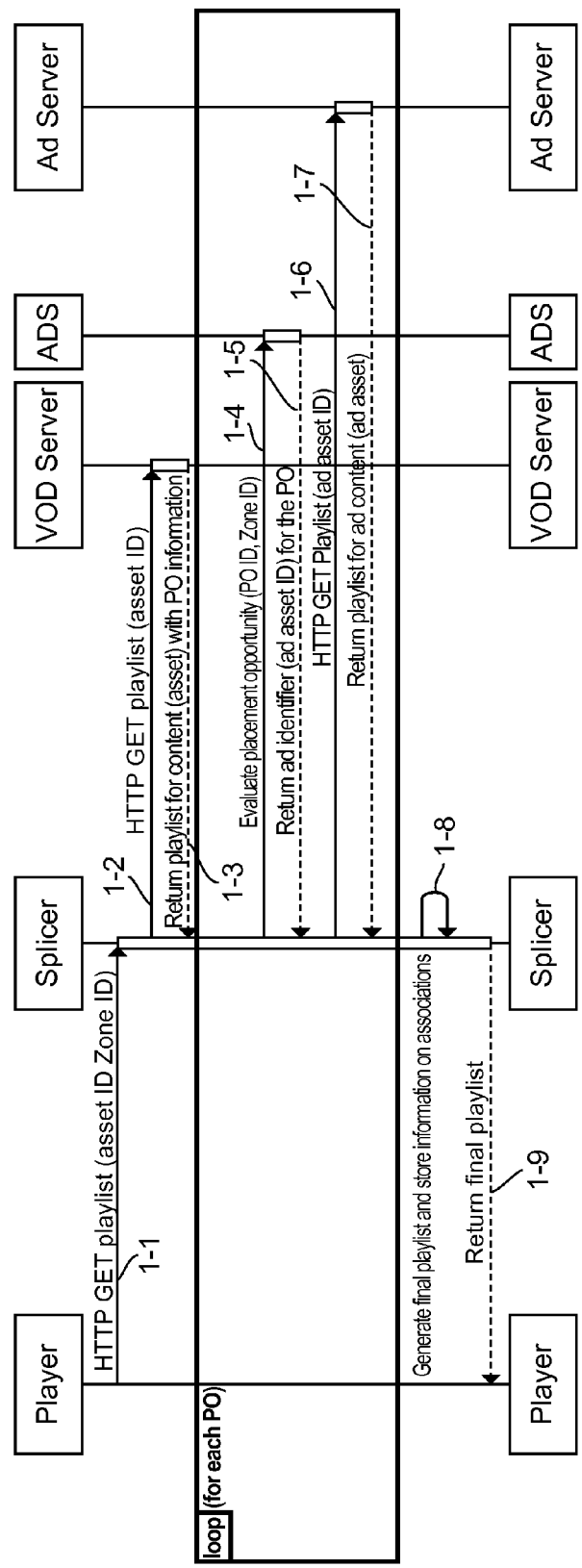

(52) U.S. Cl.
CPC ........ *H04L 65/4084* (2013.01); *H04L 65/605* (2013.01); *H04L 2012/2849* (2013.01)

(58) Field of Classification Search
CPC ............... H04L 65/4084; H04L 65/605; H04L 12/2812; H04L 12/2834; H04L 2012/2849
USPC ................... 707/736, 100; 709/203; 715/234
See application file for complete search history.

(56) References Cited

OTHER PUBLICATIONS

French Search Report and Written Opinion dated Feb. 26, 2014 for corresponding French Application No. FR1354503, filed May 17, 2013.
Gerard Fernando et al., "HTTP Streaming of MPEG Media—Response to CfP" 93. MPEG Meeting; Jul. 26, 2010-Jul. 30, 2010; Geneva; (Motion Picture Expert Group or ISO/IEC JTC1/SC29/WG11),, No. M17756, Jul. 22, 2010 (Jul. 22, 2010), XP030046346.
Gerard Fernando et al., "DASH Evaluation Experiment #4: Delivery Format Addressing", 94 MPEG Meeting; Oct. 11, 2010-Oct. 15, 2010; Guangzhou; (Motion Picture Expert Group or ISO/IEC JTC1/SC29/WG11),, No. M18012, Oct. 28, 2010 (Oct. 28, 2010).
English Translation of the French Written Opinion dated Feb. 26, 2014 for corresponding French Application No. FR1354503, filed May 17, 2013, all pages.

\* cited by examiner

METHOD FOR MANAGING PERSONALIZED PLAYING LISTS OF THE TYPE COMPRISING A URL TEMPLATE AND A LIST OF SEGMENT IDENTIFIERS

1. FIELD OF THE INVENTION

The field of the invention is that of broadcasting by streaming (also called "live broadcasting", "stream broadcasting" or "transit playing") enabling a player device or player (also called a "multimedia player" or "media player") to play a (audio or video) stream as and when it is being broadcast.

More specifically, the invention pertains to a technique for managing personalized playlists.

The invention has numerous applications, especially but not exclusively, advertisement insertion (ad insertion) and program substitution.

2. TECHNOLOGICAL BACKGROUND

Stream broadcasting is generally contrasted with broadcasting by the downloading of files in which all the data of a content needs to be retrieved before it can be listened to or watched. However, from the theoretical viewpoint, streaming is a form of downloading because there is an exchange of raw data between a customer and a server, but the storage is temporary and does not appear directly in the form of files on the recipient's hard disk drive.

Stream broadcasting is used especially for video on demand (VOD) services and live program transmission or live streaming.

It is generally possible to distinguish between three types of streaming:

- traditional streaming which enables "continuous playing". Only one file, containing the same information several times, is broadcast with different levels of quality, and a specialized server is responsible for the broadcasting of information adapted (to the connection bitrate of the customer and to the bandwidth). The exchanges between server and customer can use a standardized protocol (for example the RTP or Real Time Transport Protocol or the RTSP or Real Time Streaming Protocol) or a proprietary protocol (for example MMS or Microsoft Media Services which is owned by Microsoft) or RTMP (Real Time Messaging Protocol which is owned by Adobe Systems);
- pseudo-streaming (also called "progressive downloading") which enables "progressive playing". This pseudo-streaming relies on the HTTP (HyperText Transfer Protocol) and does not require any specialized server (a standard HTTP server being sufficient). The audio or video file is simply proposed when downloading and it is the customer who sees to it that the file is played, starting before the file is completely downloaded;
- adaptive streaming which generally relies on the HTTP protocol (although it can be used with other customer-server communication protocols). It is based on the gradual downloading by the customer of small segments of the content (multimedia stream). The duration of these segments, also called chunks, is for example from 2 to 4 seconds. Adaptive streaming is therefore an adaptation of the second streaming technique presented here above (progressive downloading). It is adaptive in that each segment is chosen by the customer from several segments having the same content but encoded with different bitrates. The main formats currently available for adaptive streaming are "HTTP Live Streaming" (HLS), proposed by Apple, "Smooth Streaming" (SS), proposed by Microsoft, "HTTP Dynamic Streaming" (HDS), proposed by Adobe, and "Dynamic Adaptive Streaming over HTTP" (DASH or MPEG-DASH), proposed by MPEG.

In the present description, the term "adaptive streaming" is understood to mean also the particular case (although it is not adaptive in the above-mentioned sense) in which there is only one bitrate available for each segment.

Here below in the description (and in the context of the present invention), the focus will be on techniques of broadcasting by adaptive streaming that rely on the use of a playlist also known as a manifest, an index or an MPD (media presentation description).

A playlist is a file that contains an ordered sequence of references to media files. Typically, the reference of a media file is a uniform resource identifier (URI) such as for example a uniform resource locator (URL). Media files are of short duration (for example from 1 to 10 seconds) and can be read in sequence to build a continuous, partial or complete media presentation. In the case of adaptive streaming, these short-duration media files correspond to the segments or chunks mentioned further above. The playlist and the segments are not located locally on the player but on a remote server to which the player must send a request in order to get a playlist and the segments. The player downloads and analyzes the playlist. Then, it downloads, analyses, decodes and renders the referenced segments in the playlist in order to render the media presentation (on video for example).

For example, in the solution proposed by Apple and described especially in the document "HTTP Live Streaming Overview"? the architecture of the system of broadcasting by adaptive streaming comprises:

- a preparation component comprising a media encoder which delivers an encoded media content (for example in the MPEG-2 TS format) and a stream segmenter which divides the encoded media content into segments (small media files of short duration) and also creates a playlist or index file containing the references of the segments (and more specifically the URL addresses of the segments). The segmenter can create several playlists for a same content, each list referencing encoded segments with a different bitrate. In one alternative embodiment, the segmenter can create one single playlist for a given content, this single list referencing encoded segments with different bitrates. For example, in the case described further above of a playlist comprising a URI template, this playlist comprises a bitrate identifier (for example: http://server/cnn/{bitrate}/{timestamp}). The segments and the playlists are saved in the ".ts" format and the ".M3U8" format respectively;
- a distribution component comprising a server which delivers the playlist or lists and the segments of each playlist to the customer (player device or player) via the HTTP protocol;
- a customer component comprising the player which retrieves the playlist or playlists from the server. Using the content of the retrieved playlist or lists, the player sequentially downloads the segments (with the bitrate desired for each segment) and renders them to the user in the form of a continuous stream. Thus, in the multi-bitrate case, all the segments of the sequence downloaded by the player are not at the same bitrate.

In practice, the content delivery network or CDN is implemented between the servers and the players. Since this CDN network is transparent relative to the mechanisms described here above and here below in the description, it shall not be described. Solely with a view to simplifying the description, the player shall be considered here below to be directly transmitting its requests to the server.

Two types of playlists can be distinguished:
- those that directly contain the references of the segments. In receiving a playlist, the customer device receives the URI (for example in URL form) of each segment. This is for example the case in the "HTTP live streaming" (HLS) solution by Apple, with the player file that contains the URL addresses of the segment;
- those that do not directly contain the references of the segments but contain two complementary pieces of information: a URI template (for example a URL template) and a list of segment identifiers (for example a list of timestamp information, a list of indices, etc). It is the player that rebuilds the reference (for example the URL) of each segment by combining the template and the identifier (the timestamp) of this segment. This is for example the case in the "smooth streaming" (SS) solution by Microsoft, with a playlist called a "customer manifest" which contains pieces of information such as types of stream, parameters, bitrates and segment timestamp information (or timestamps).

In the case of the broadcasting of a content in VOD mode, the playlist contains information (direct or indirect references) on all the segments of the content.

In the case of a live program broadcast or live streaming, this is not possible: in the HLS solution by Apple, the playlist is downloaded repeatedly by the customer (player device) which thus permanently has an updated list of the last available segments; in the SS solution by Microsoft, each segment contains information (lookahead information) enabling the customer to access the next segment (or a few following segments). Hence, no downloading of an updated playlist is needed.

There are several applications that require an adaptation (i.e. a customizing) of the content of the playlist to each user (player) especially:
- Ad insertion: the final content played by the player comprises segments of advertisements which are introduced between certain segments of the initial content and/or instead of certain segments of the initial content. An ad decision server (ADS) can be used to decide which advertisement is to be inserted for each customer (for example depending on the geographical area in which he is located). The ad segments can be provided by an advertisement server or ad server; and
- Program substitution: in certain situations, rights over the contents do not permit the broadcasting of a program in a region, and the player must therefore be given a substitute program. For example, a sports event in a stadium can be broadcast nationwide but must be blocked at the local level (for example in the city in which it takes place) and replaced by another content so as not to cause a drop in attendance at the stadium.

To adapt of the content of the playlist in this way, an splicer, also called a playlist manipulator or "splicer", acts between the server (giving the initial playlist and the segments) and the player.

Should the playlist directly contain the references of the segments (this is the case of the HLS solution by Apple with a playlist comprising a list of URLs of segments), the splicer modifies the playlist by introducing ad segment URLs. This is done according to information provided by the player (in the get-list requests) and pertaining for example to the user (geographical location, sex, age, etc).

In the HLS solution, for a VOD content, the splicer inserts for example references (URLs) of ad segments at the start of the playlist returned to the player (or else at another position of the playlist, indicated by a piece of "placement opportunity information". These references point towards segments of one or more advertisements, targeted for example according to the geographical area of the user of the player.

In the HLS solution, for live content or live streaming, the segmenter inserts for example specific markers which are associated with certain segment references in the playlist and enable the identifying of the start and the end of the insertion of ad segments in the original content. The splicer can then replace the preliminarily marked segments references by ad segment references. These segments point towards segments of one or more advertisements, targeted for example according to the geographical area of the user of the player.

Should the playlist not directly contain the references of the segments (this is the case of the SS solution by Microsoft, with a playlist comprising a URL template and a list of segment identifiers), the splicer cannot directly introduce modifications, into the playlist, aimed at introducing references to ad segments located on a server different from the one storing the segments of the content requested by the user (VOD content or live program). Indeed, the playlist enables the player to generate only references (URLs) pointing towards the location that is hard-coded in the URL template. For this reason, in known implementations, as insertion in a playlist based on a template (i.e. comprising a template and a list of segment identifiers) is done by adding additional information to the playlist indicating that an advertisement break occurs at a certain point in time. Thus, the player can apply an ad insertion logic, in contacting an ad server that returns ad segments to be read during the advertisement break, instead of the segments of the original content.

One drawback of this last-named technique is that it is the player that ultimately personalizes the content. To manage this mechanism, the player must be adapted as a personalized player. This makes it more costly to use since it requires a particular development and entails maintenance overheads.

3. GOALS OF THE INVENTION

The invention in at least one embodiment is aimed especially at overcoming this drawback of the prior art.

More specifically, it is a goal in at least one embodiment of the invention to provide a technique making it possible, should the playlist not directly contain the references of the segments (while containing a URI template and a list of segment identifiers), to carry out a customizing of the playlist (and therefore of the content read by the player) without any need for the player to be adapted to carry out the customizing of the content by itself.

It is another goal of at least one embodiment of the invention to provide a technique of this kind that is compatible with the mechanism (discussed further above) for chaining segments in the case of live streaming of a program.

It is another goal of at least one embodiment of the invention to provide a technique of this kind that relies on a simple customer-server communications protocol such as for example the HTTP protocol.

It is another goal of at least one embodiment of the invention to provide a technique of this kind that is simple to implement and costs little.

4. SUMMARY OF THE INVENTION

In one particular embodiment of the invention, a method is proposed for managing personalized playlists of the type comprising a uniform resource identifier template and a list of segment identifiers. This method comprises a first phase for the managing, by means of a first splicer, of a request for getting lists (or "get-list request") transmitted by a player and parameterized with an identifier of the first content, and a group identifier defining a group comprising at least one user and at least one player, the first phase comprising the following steps:

a) getting an initial playlist comprising, on the one hand, a first uniform resource identifier template pointing towards a first server and pre-parameterized with the identifier of the first content and, on the other hand, a first list of segment identifiers, each segment identifier of the first list making it possible, when used as a parameter of the first template, to generate a uniform resource identifier pointing towards a segment of the first content;

b) building a final playlist comprising, on the one hand, a second uniform resource identifier template pointing towards a second splicer, coinciding or not coinciding with the first splicer, and pre-parameterized with the identifier of the first content and the group identifier and, on the other hand, a second list of virtual segment identifiers, each virtual segment identifier making it possible, when used as a parameter of the second template, to generate a uniform resource identifier pointing towards one of said virtual segments, each virtual segment being associated either with a segment of the first content or with an alternative segment of a set of alternative segments included in at least one alternative content;

c) transmitting the final playlist to the player.

This particular embodiment of the invention relies on a wholly novel and inventive approach which consists, for the first playlist manipulating splicer (also called a playlist manipulator or splicer), in building a final playlist enabling the player to generate URIs pointing towards virtual segments managed by the second splicer (which is either distinct from the first splicer or coincides with it).

In a second phase described here below, the player uses the final playlist to generate, for each virtual segment whose final playlist comprises an identifier, a get-segment request pointing towards the second splicer and parameterized with the identifier of this virtual segment.

Through this mechanism, it is the first splicer that personalizes the initial playlist (despite the fact that this list is of the type comprising a URI template and a list of segment identifiers). The player requires no adaptation (by itself, it carries out neither the customizing of the initial playlist nor the customizing of the content). It is enough for example for the player to be compliant with the HTTP protocol.

As explained further above, the present invention is situated in the context of adaptive streaming, including:

the most frequent case in which there are several bitrates available for each segment (with either several playlists each associated with a distinct bitrate, or a single playlist the URI template of which comprises a bitrate identifier (for example: http://server/cnn/{bitrate}/{timestamp})), but also the special case in which there is only one bitrate available for each segment (hence only one playlist).

For the sake of simplifying the explanation of the invention, the bitrate aspect is not discussed because it has no impact on the mechanism proposed:

in the first phase:
  in the multi-bitrate case, with a distinct playlist for each bitrate: it is assumed that the final playlist, and therefore also the initial playlist, is associated with a given bitrate. If several bitrates are possible, it is enough to apply the proposed method for each possible bitrate (so as to generate a final playlist for each possible bitrate);
  in the multi-bitrate case, with a single playlist for all the bitrates: it is assumed that the final playlist, and therefore also the initial playlist, possesses a URI template comprising a bitrate identifier.

in the second phase:
  in the multi-bitrate case, with a distinct playlist for each bitrate: it is assumed that the get-segment request is specific to a given bitrate (as the case may be, among several possible bitrates);
  in the multi-bitrate case with a single playlist for all the bitrates: it is assumed that the get-segment request is parameterized with a particular value of the bitrate identifier (corresponding to one of the possible bitrates).

According to one particular characteristic, the first content belongs to the group comprising video-on-demand contents and live broadcast or streaming contents.

According to one particular characteristic, the step b) comprises a step for storing information. This step makes it possible, for each virtual segment identifier of the second list that identifies a virtual segment associated with a given segment of the first content or a given segment of said at least one alternative content, to obtain:

a uniform resource identifier pointing to said given segment, the group identifier and the identifier of the first content from an n-uplet comprising said virtual segment identifier of the second list.

The pieces of information stored are used subsequently during the second phase discussed here below. In one variant, this step for storing is not performed (the association is then determined again during the second phase discussed here below).

In a first particular mode of implementation of the first phase (ad insertion application or program substitution application), the initial playlist additionally comprises at least one piece of information on change, relating to the possibility of inserting one or more alternative segments in the first content or of replacing one or more segments of the first content by one or more alternative segments. The step b) comprises the following steps:

depending on said group identifier and for each piece of information on change, getting a playlist of a given alternative content, comprising on the one hand a third uniform resource identifier template pointing towards a server of alternative contents coinciding or not coinciding with the first server and pre-parameterized with the identifier of said given alternative content and, on the other hand, a third list of alternative segment identifiers of said given alternative content;

creating said second list of virtual segment identifiers, in combining the first list of segment identifiers with the third list or each third list of alternative segment identifiers, as a function of the piece of information on change or of each piece of information on change.

According to one particular characteristic, the step for obtaining a playlist list of a given alternative content, as a function of said group identifier and for each piece of information on change, comprises the following steps:

getting, by means of a decision mechanism internal to the first splicer, or from a decision server, an alternative content identifier, as a function of the group identifier and an identifier of said information on change;

getting said playlist of the given alternative, possessing the alternative content identifier that is got.

According to one particular characteristic, each alternative content belongs to the group comprising the following: video contents, especially advertising contents; and live streaming contents.

In a first particular case ("ad insertion" application) of the first implementation, said at least one piece of information on change is a placement opportunity, indicating a possibility of placing an advertising content in the first content.

In a second particular case ("program substitution" application) of the first implementation, said at least one piece of information on change is a piece of blackout information, indicating a period of blackout during which the first content must be replaced by an alternative content.

In a second particular implementation of the first phase ("marking" or "watermarking" application) the identifier of each alternative content is identical to the identifier of the first content. The first content and each alternative content comprise identical segments except for the presence, in each same-ranking segment of said first content and of said alternative content, of a distinct digital watermark. Each alternative content is associated with another distinct playlist, comprising, on the one hand, another uniform resource identifier template and, on the other hand, another list of identifiers of alternative segments of said alternative content. Each other playlist is distinguished from the initial playlist:

because the first uniform resource identifier template is pre-parameterized with a content variant identifier that is different from another content variant identifier with which said other uniform resource identifier template is pre-parameterized; and/or because the first list of segment identifiers is different from said other list of segment identifiers.

According to one particular characteristic, the method comprises a second phase for managing, by means of the second splicer, a get-segment request transmitted by the player and parameterized with the identifier of the first content, the group identifier and one of said virtual segment identifiers, the second phase comprising the following steps:

i) identifying a segment as a function of the parameters of said get-segment request, the identified segment being either a segment of said first content or an alternative segment of said at least one alternative content;

ii) determining a uniform resource identifier pointing towards the identified segment; and iii-a) transmitting the determined uniform resource identifier to the player; or iii-b) transmitting the segment pointed at by the determined uniform resource identifier to the player.

According to one particular characteristic, at the step i) the second splicer uses the information preliminarily stored in the storage step.

According to one variant, at the step i), the second splicer executes a deterministic algorithm which inputs the identifier of the first content, the group identifier, and the virtual segment identifier with which the get-segment request is parameterized and which outputs the identified segment.

Advantageously, in the case of the "ad insertion" application or "program substitution" application, the second phase also comprises a step for getting lookahead information describing at least one virtual segment which, in the second list of virtual segment identifiers, follows the virtual segment pointed at by said get-segment request. The step iii-a) is preceded by a copying step for the copying, by insertion or replacement, of said lookahead information in the uniform resource identifier pointing towards the identified segment. In response to a get-segment request transmitted by the player and parameterized with the uniform resource identifier transmitted by the second splicer, the first server or the alternative content server, by insertion or replacement, copies said lookahead information into the identified segment and then transmits it to the player.

According to one particular characteristic, the second phase also comprises a step for getting lookahead information describing at least one virtual segment which, in the second list of virtual segment identifiers, follows the virtual segment pointed at by said get-segment request. The step iii-b) output is preceded by a step for the copying, by insertion or replacement, of said lookahead information in the segment pointed at by the determined uniform resource identifier.

Advantageously, in the case of the watermarking application, at the step i) the second splicer executes a deterministic algorithm which inputs the identifier of the first content, the group identifier and the identifier of the virtual segment pointed at, and which outputs a piece of information indicating whether the segment associated with the virtual segment pointed at by said get-segment request is a segment of the first content or an alternative segment.

Another embodiment of the invention proposes a computer program product comprising program code instructions for implementing the above-mentioned method (in any one of its different embodiments) when said program is executed on a computer.

Another embodiment of the invention proposes a computer-readable and non-transient storage medium storing a computer program comprising a set of instructions executable by a computer to implement the above-mentioned method (in any one of its different embodiments).

Another embodiment of the invention proposes a first splicer for managing a personalized playlist of the type comprising a uniform resource identifier template and a list of segment identifiers, characterized in that it comprises means for managing a get-list request, transmitted by a player and parameterized with an identifier of a first content and a group identifier identifying a group of at least one user and at least one player, the means for managing comprising:

means for getting an initial playlist comprising on the one hand, a first uniform resource identifier template pointing towards a first server and pre-parameterized with the identifier of the first content and, on the other hand, a first list of segment identifiers, each segment identifier of the first list making it possible, when it is used as a parameter of the first template, to generate a uniform resource identifier pointing towards a segment of the first content;

means for building a final playlist, comprising on the one hand a second uniform resource identifier template pointing towards a second splicer, coinciding or not coinciding with the first splicer and pre-parameterized with the identifier of the first content and the group identifier and, on the other hand, a second list of virtual segment identifiers, each virtual segment identifier making it possible, when it is used as a parameter of the second template, to generate a uniform resource identifier pointing towards one of said virtual segments, each virtual segment being associated either with a segment of the first content or with an alternative segment of a set of alternative segments included in at least one alternative content;

a means for transmitting the final playlist to the player.

Another embodiment of the invention proposes a second splicer for managing personalized playlists of the type comprising a uniform resource identifier template and a list of segment identifiers, characterized in that it comprises means for managing a get-segment request, transmitted by a player and parameterized with an identifier of a first content, a group identifier identifying a group of at least one user and at least one player, and a virtual segment identifier, the means for managing comprising:

a means for identifying a segment as a function of the parameters of said get-segment request, the identified segment being either a segment of said first content or an alternative segment of said at least one alternative content;

means for determining a uniform resource identifier pointing towards the identified segment; and means for transmitting the determined uniform resource identifier to the player; or means for transmitting the segment pointed at by the determined uniform resource identifier to the player.

Advantageously, the first splicer and the second splicer comprise means for implementing steps which they perform in the method as described here above in any one of its different embodiments.

5. LIST OF FIGURES

Figure 2:
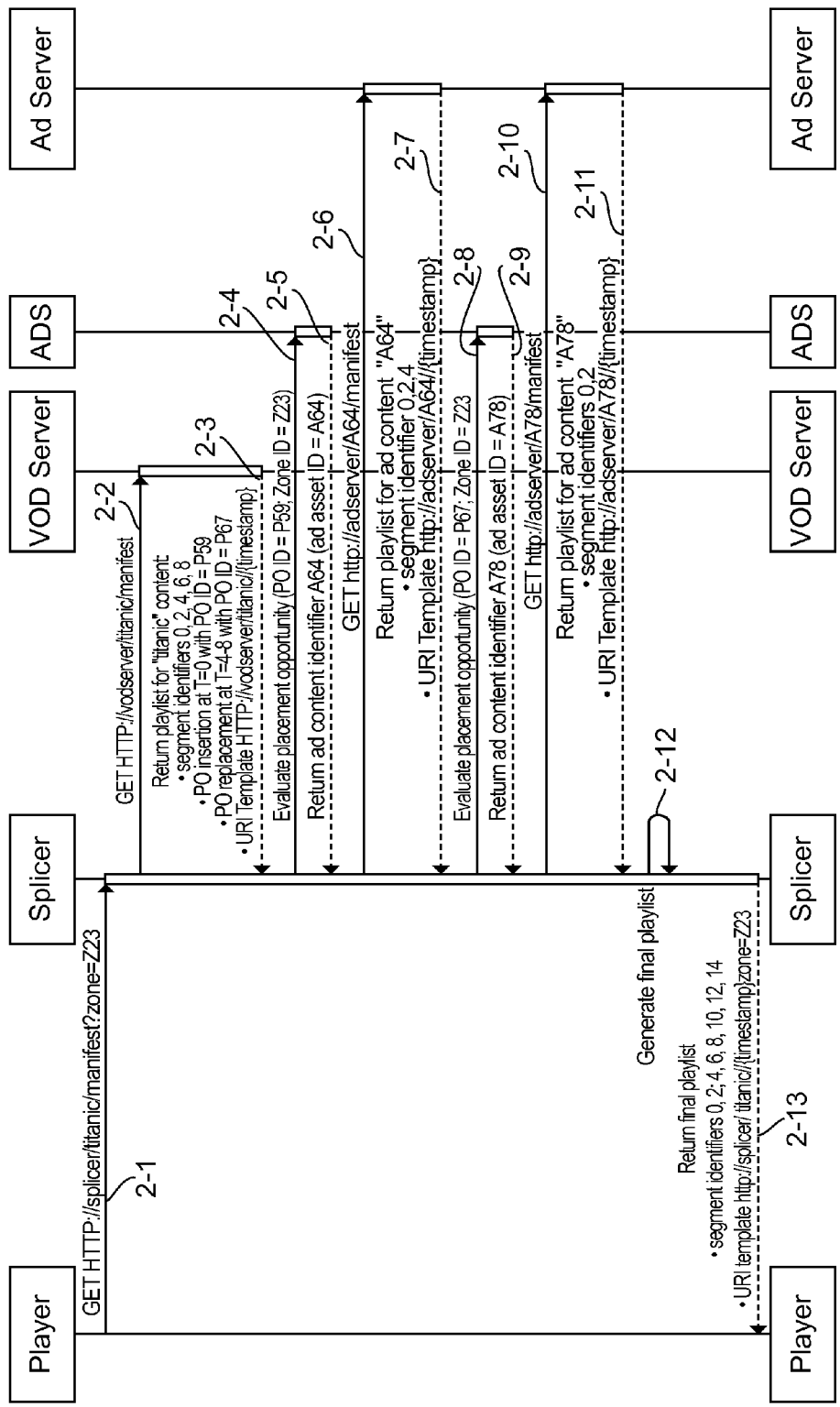
Figure 3:
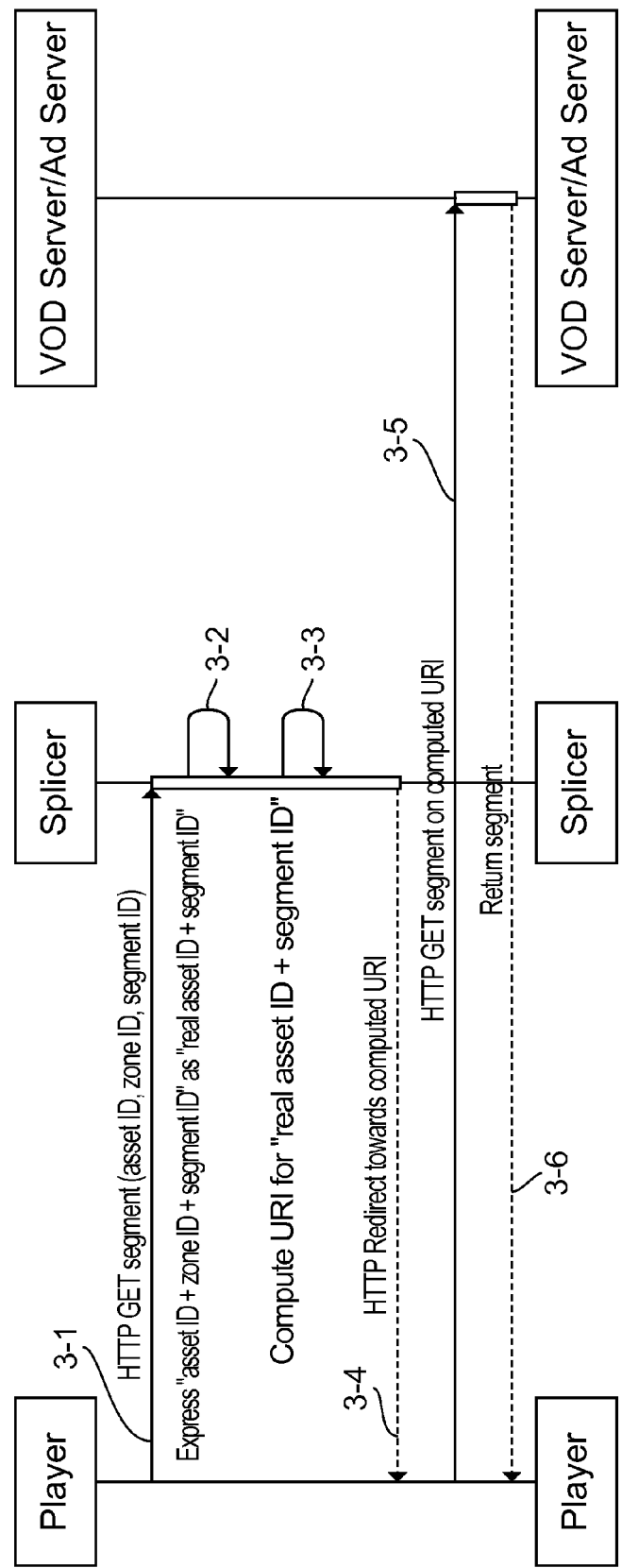
Figure 4:
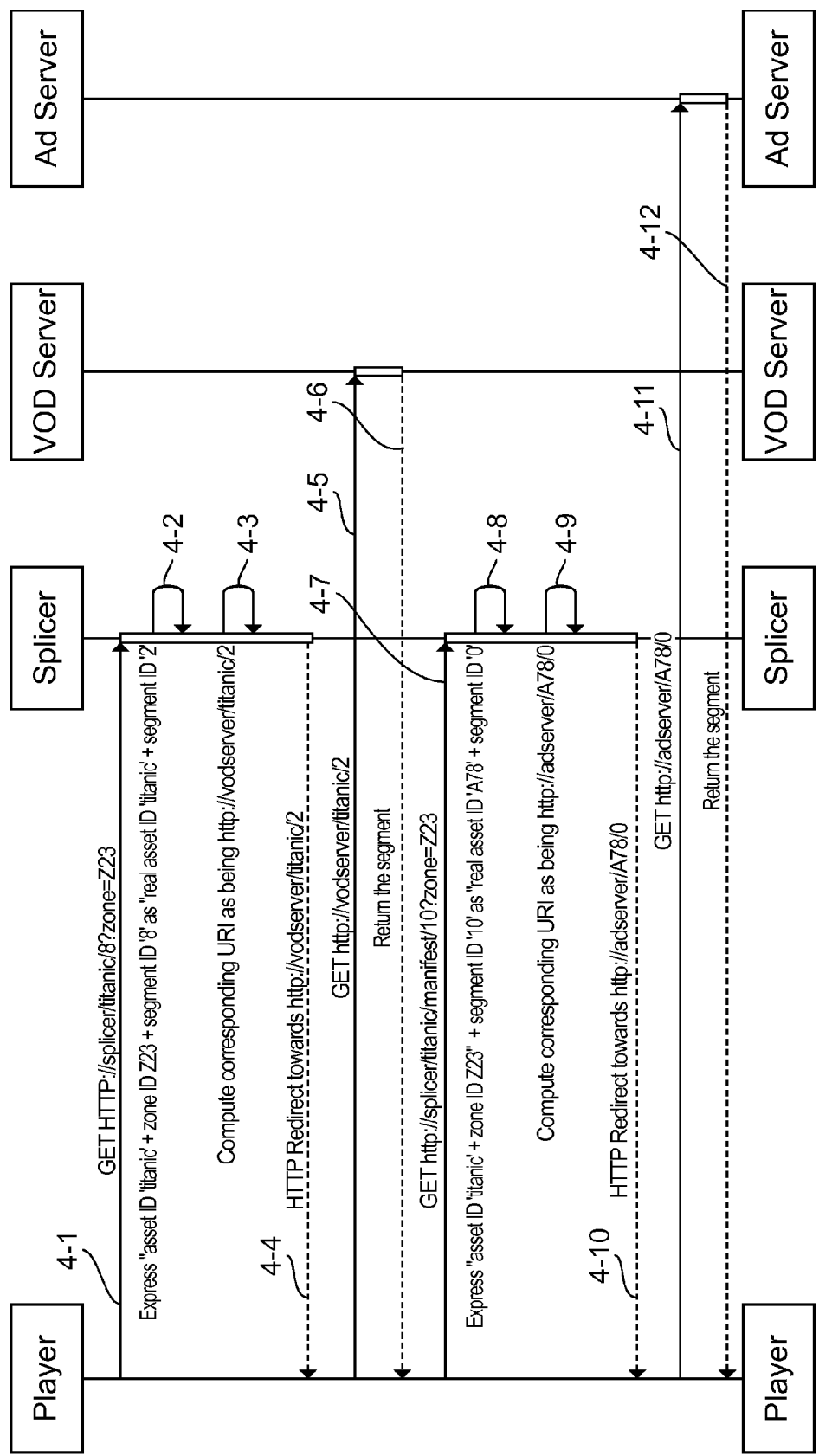
Figure 5:
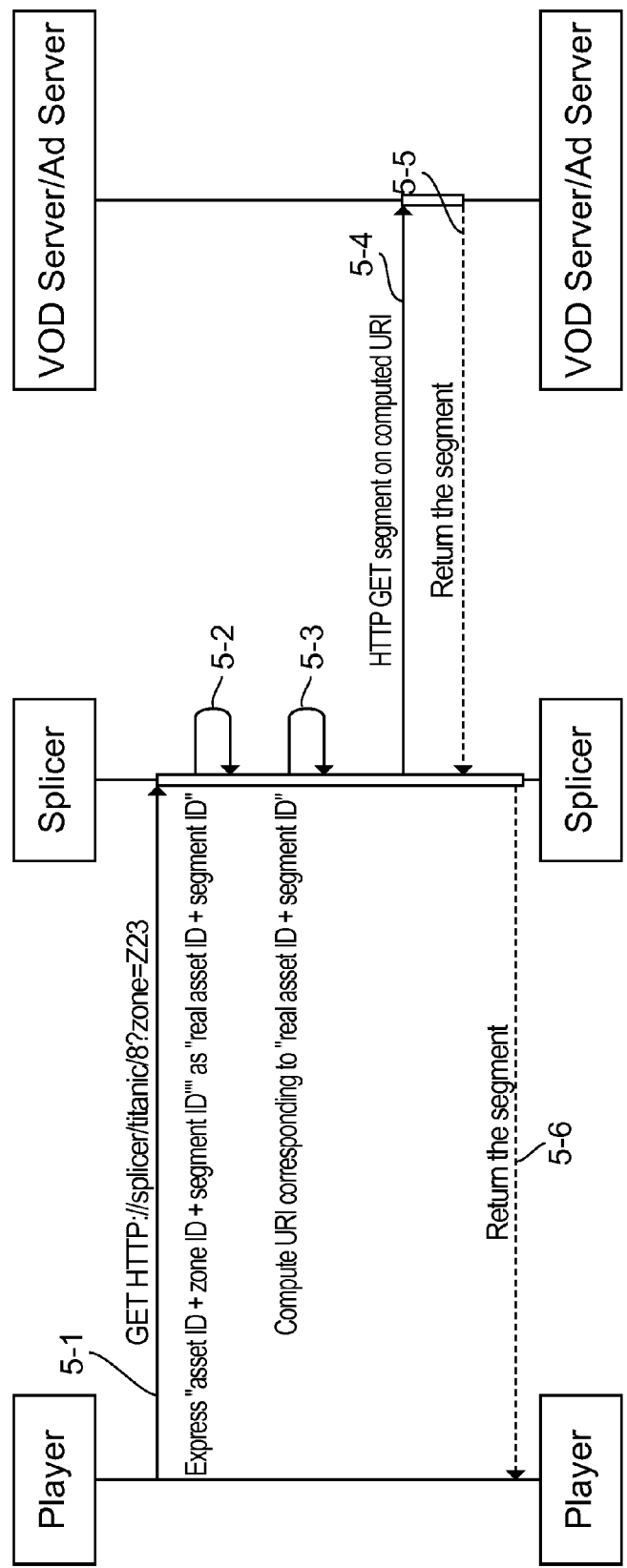
Figure 6:
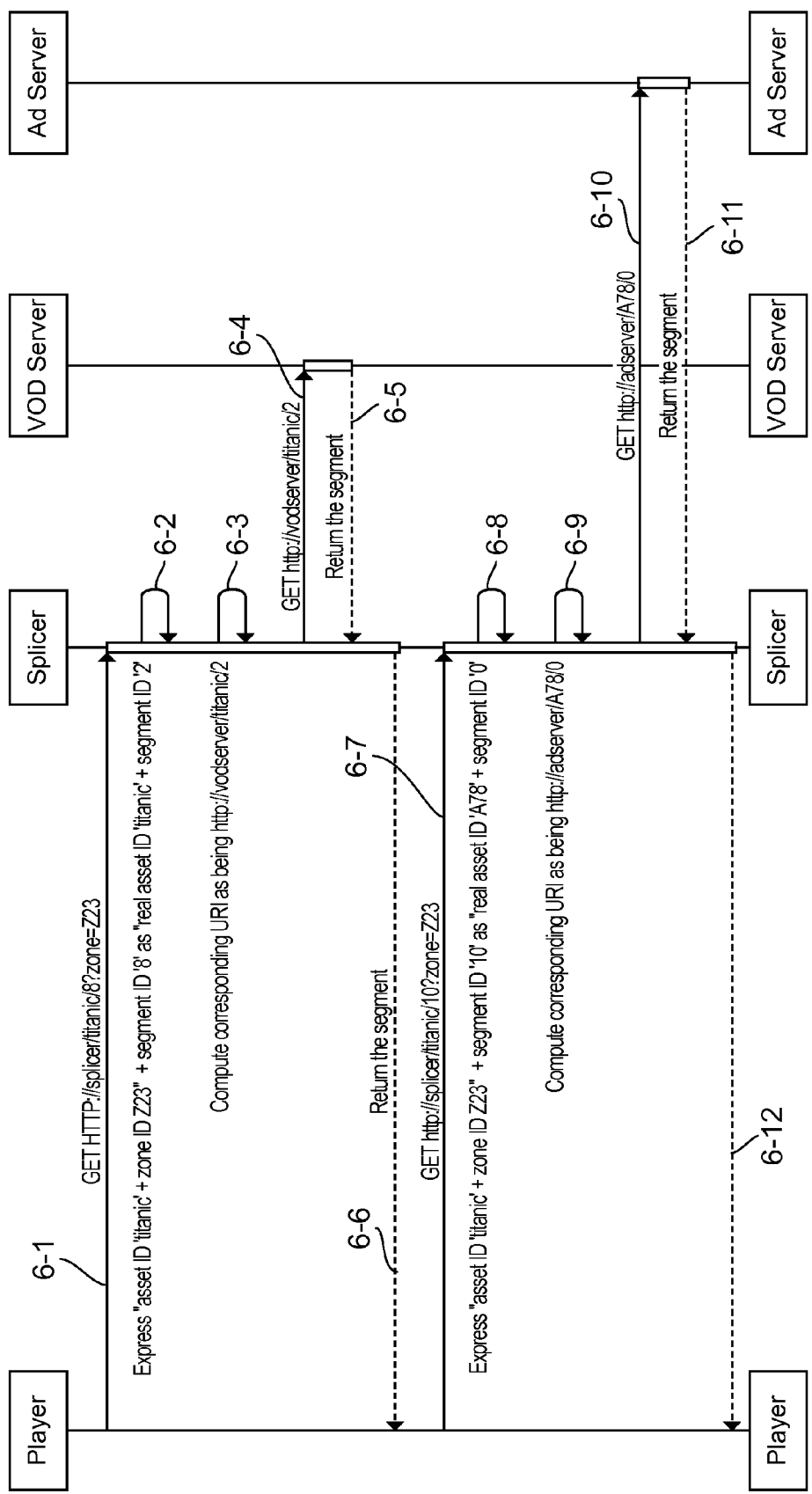
Figure 7:
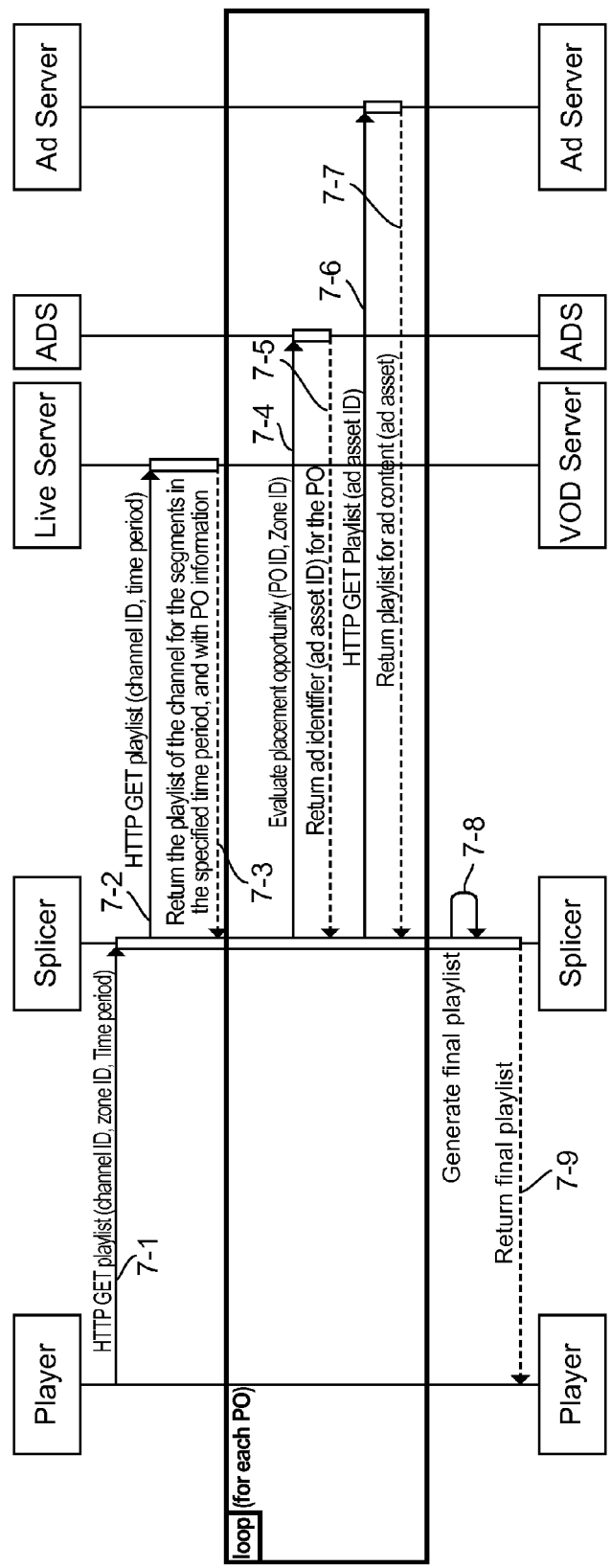
Figure 8:
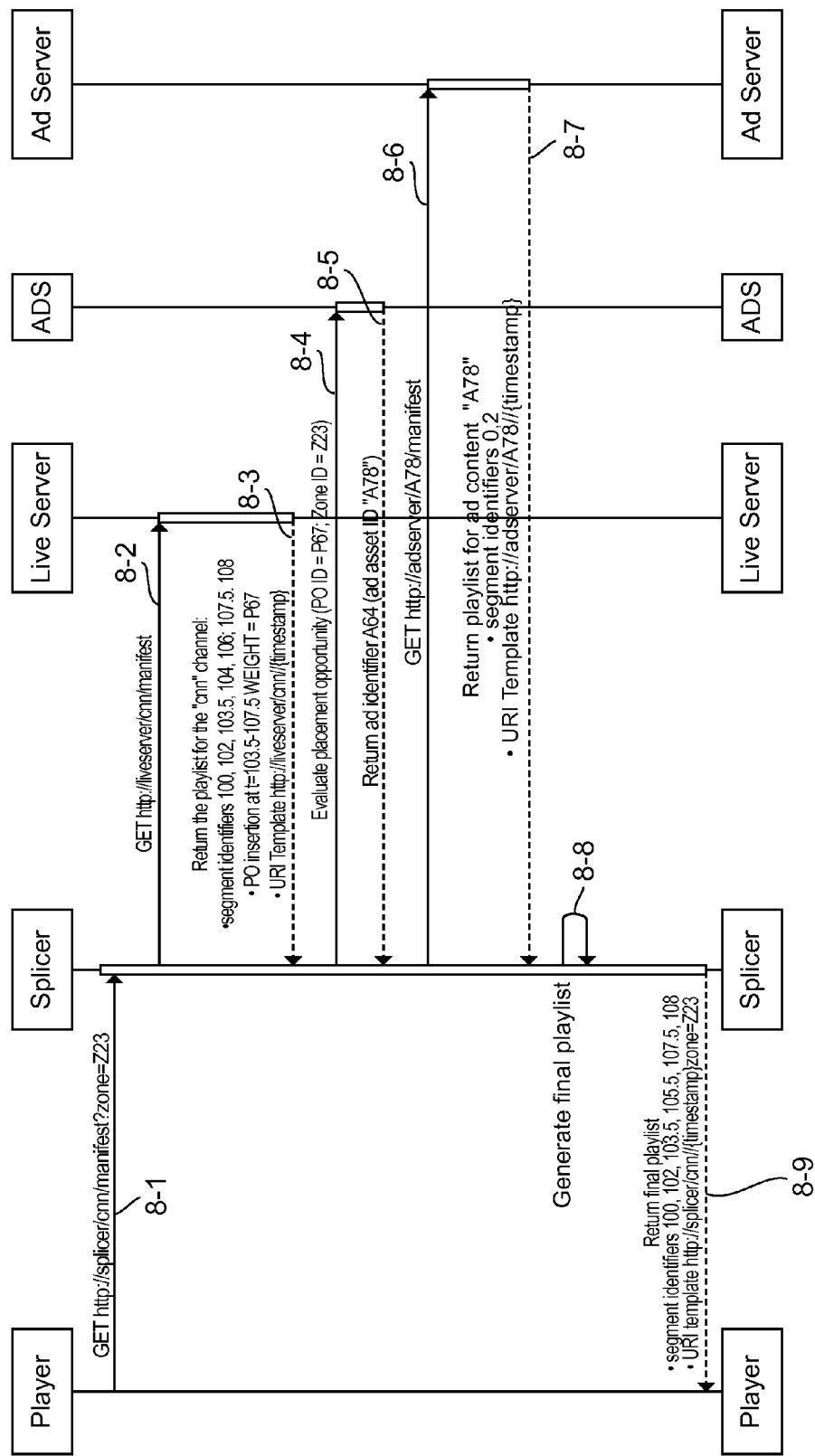
Figure 9:
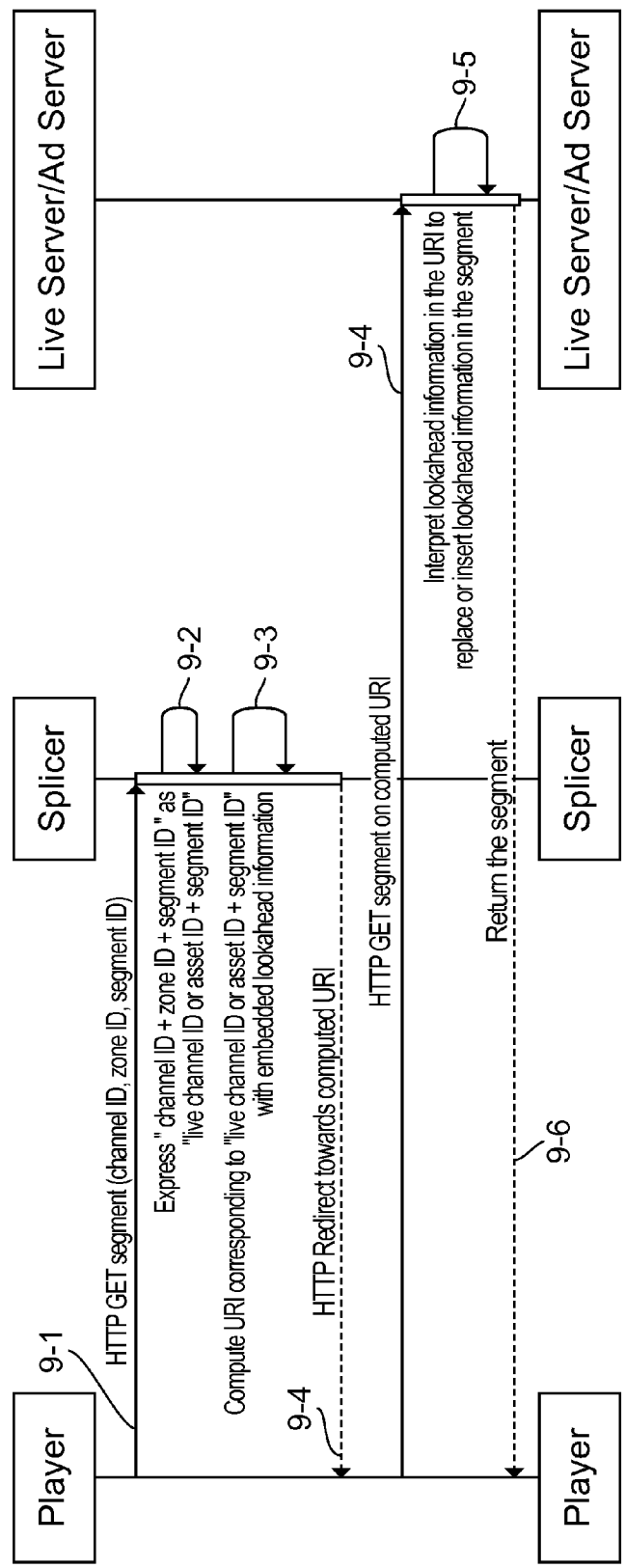
Figure 10:
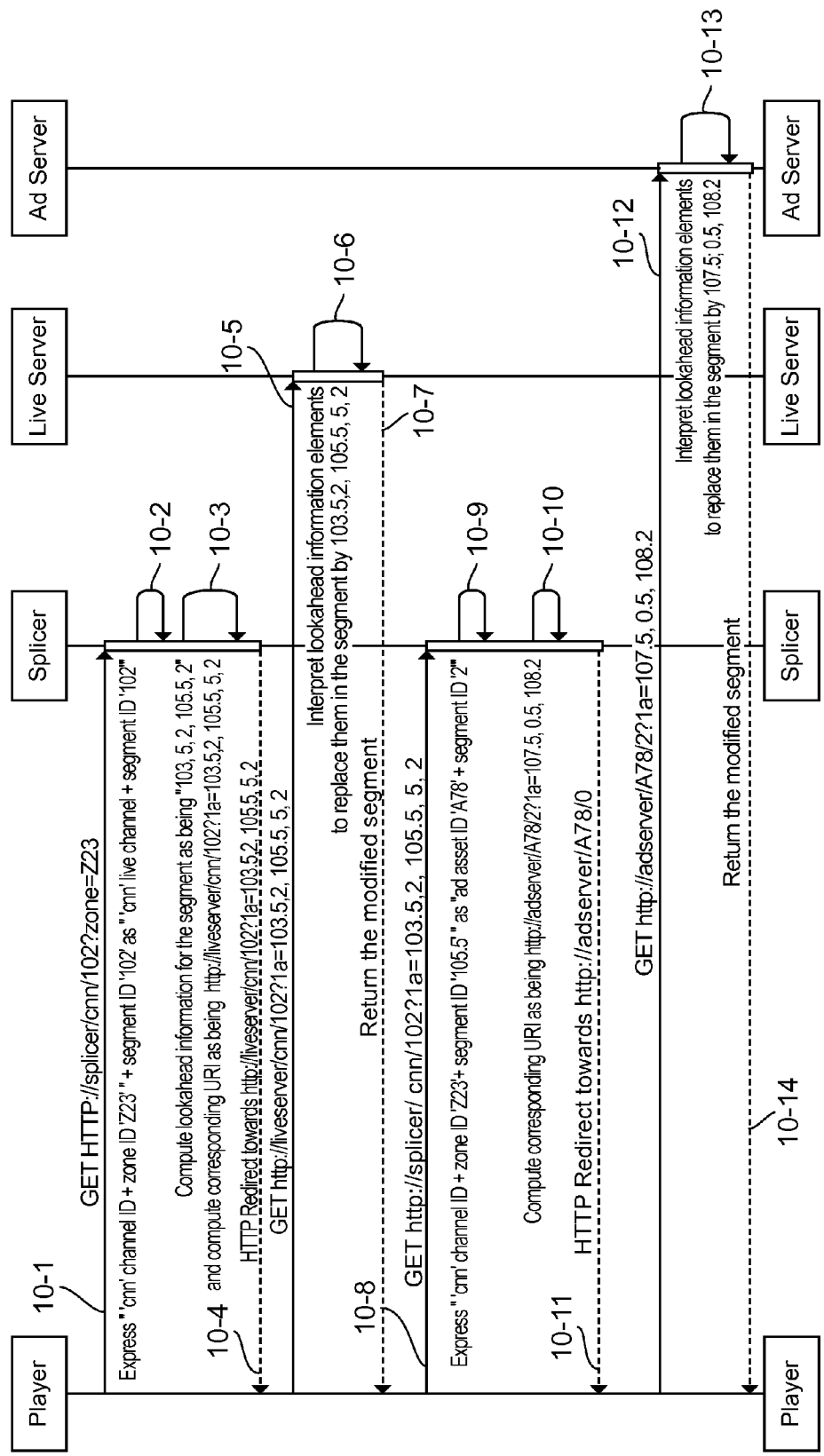
Figure 11:
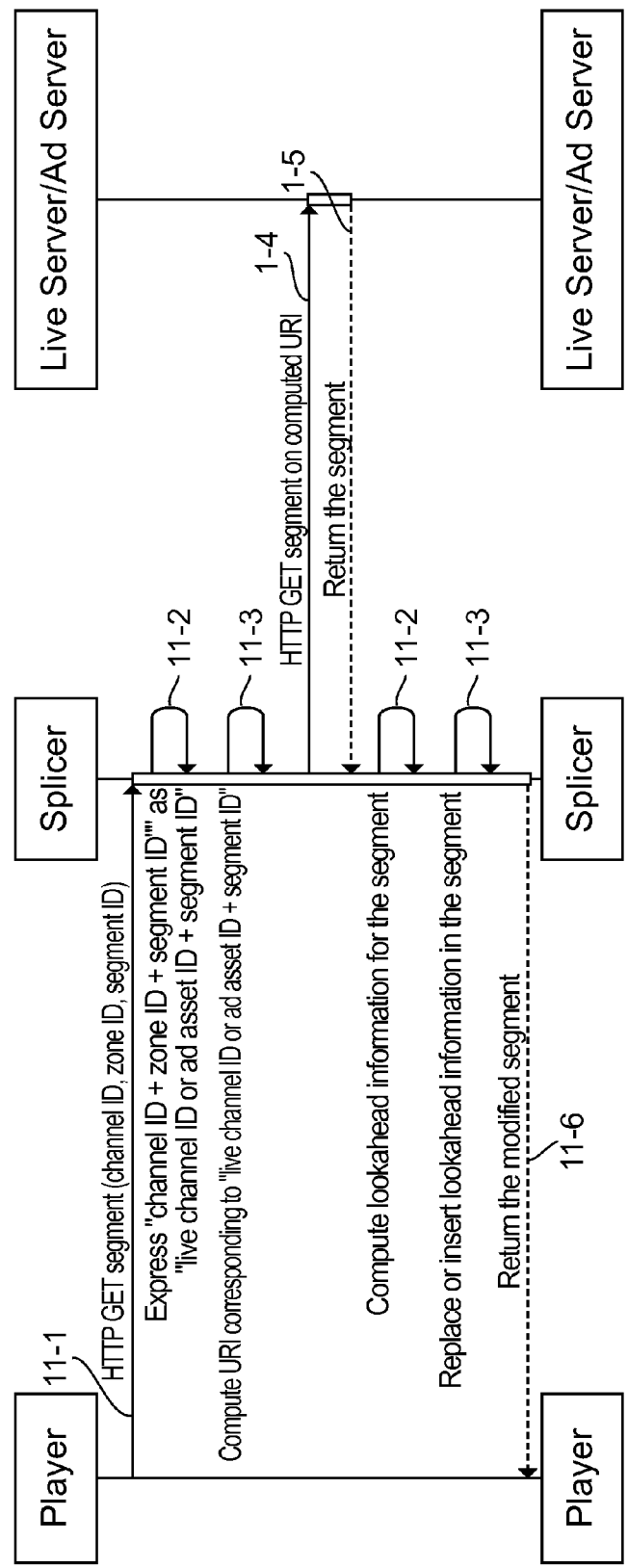
Figure 12:
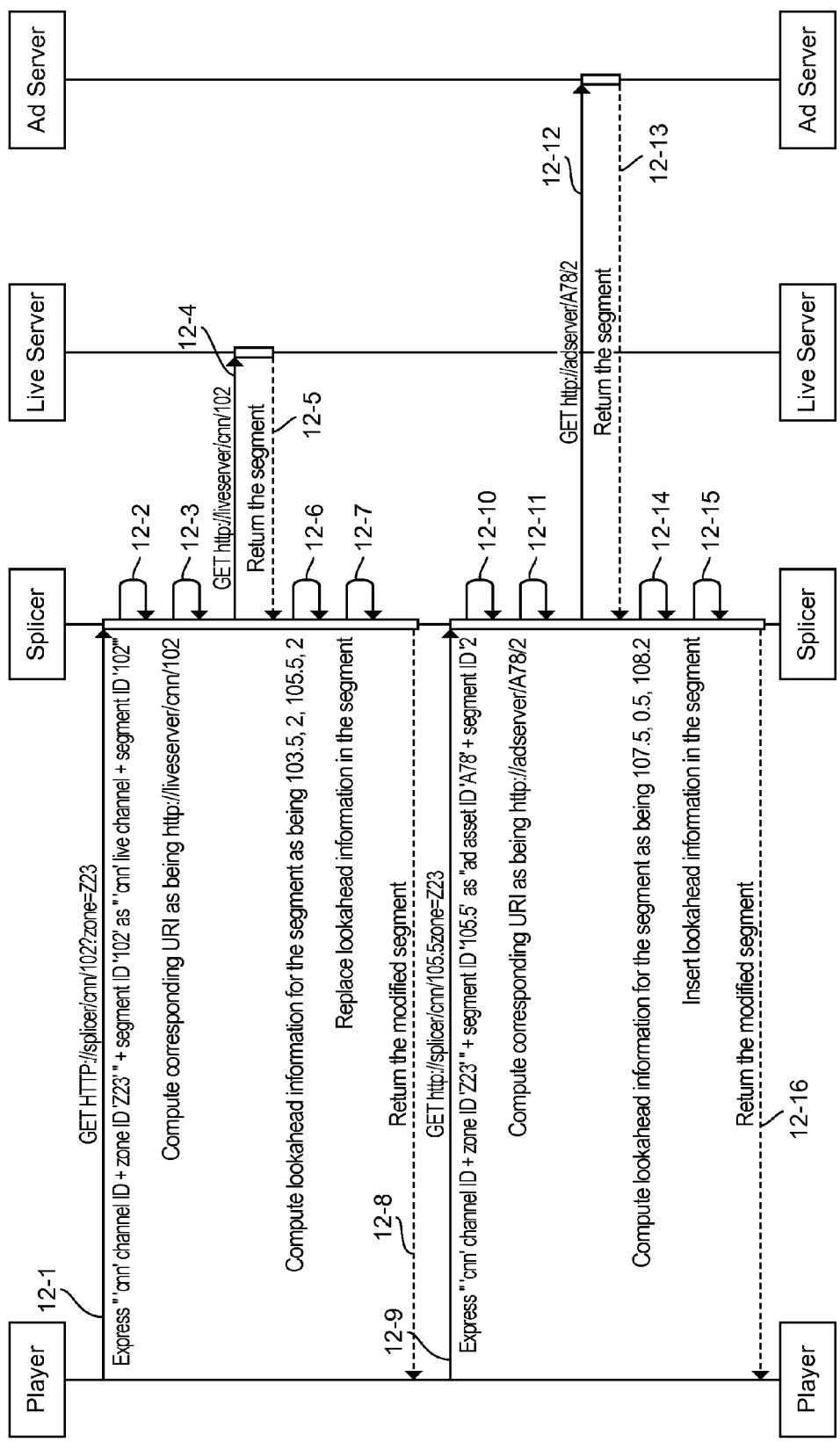
Figure 13:
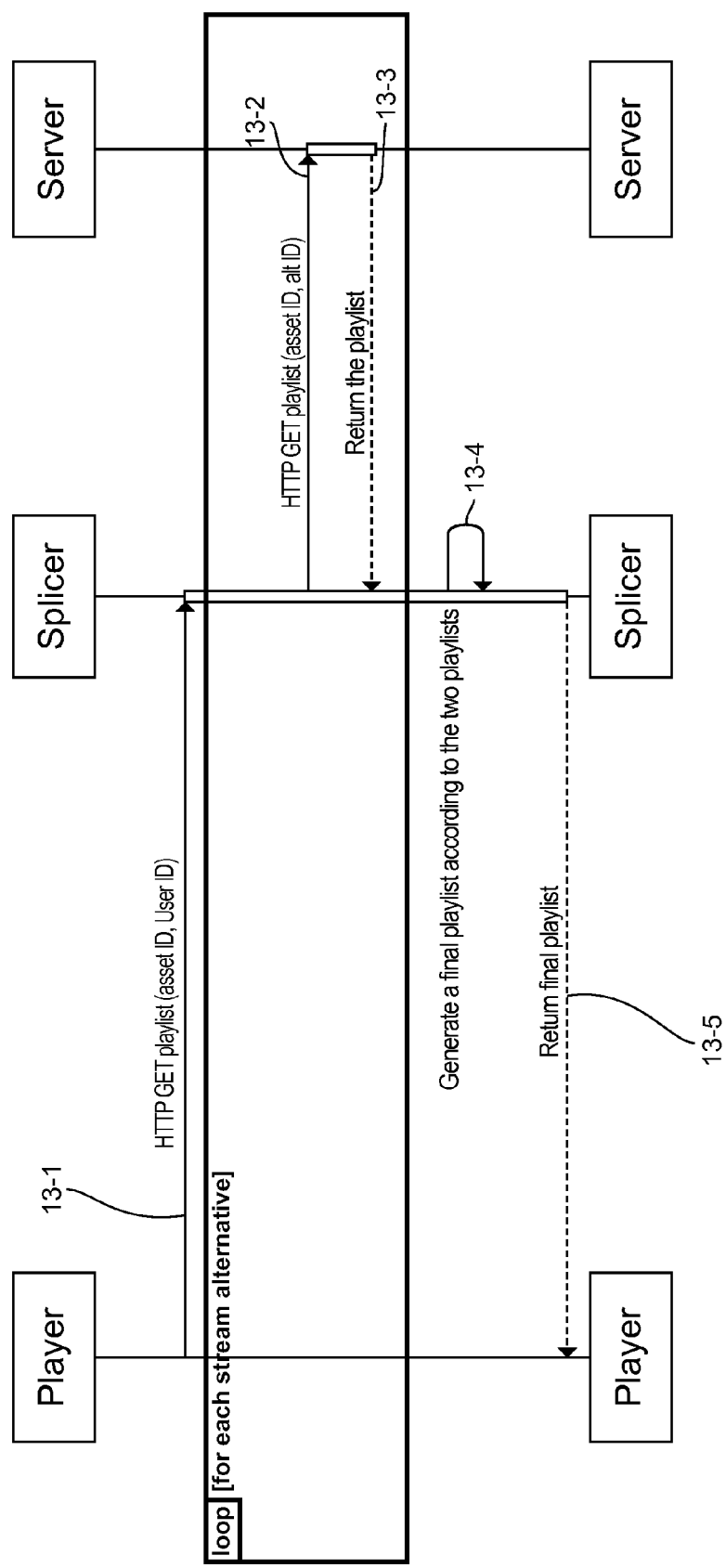
Figure 14:
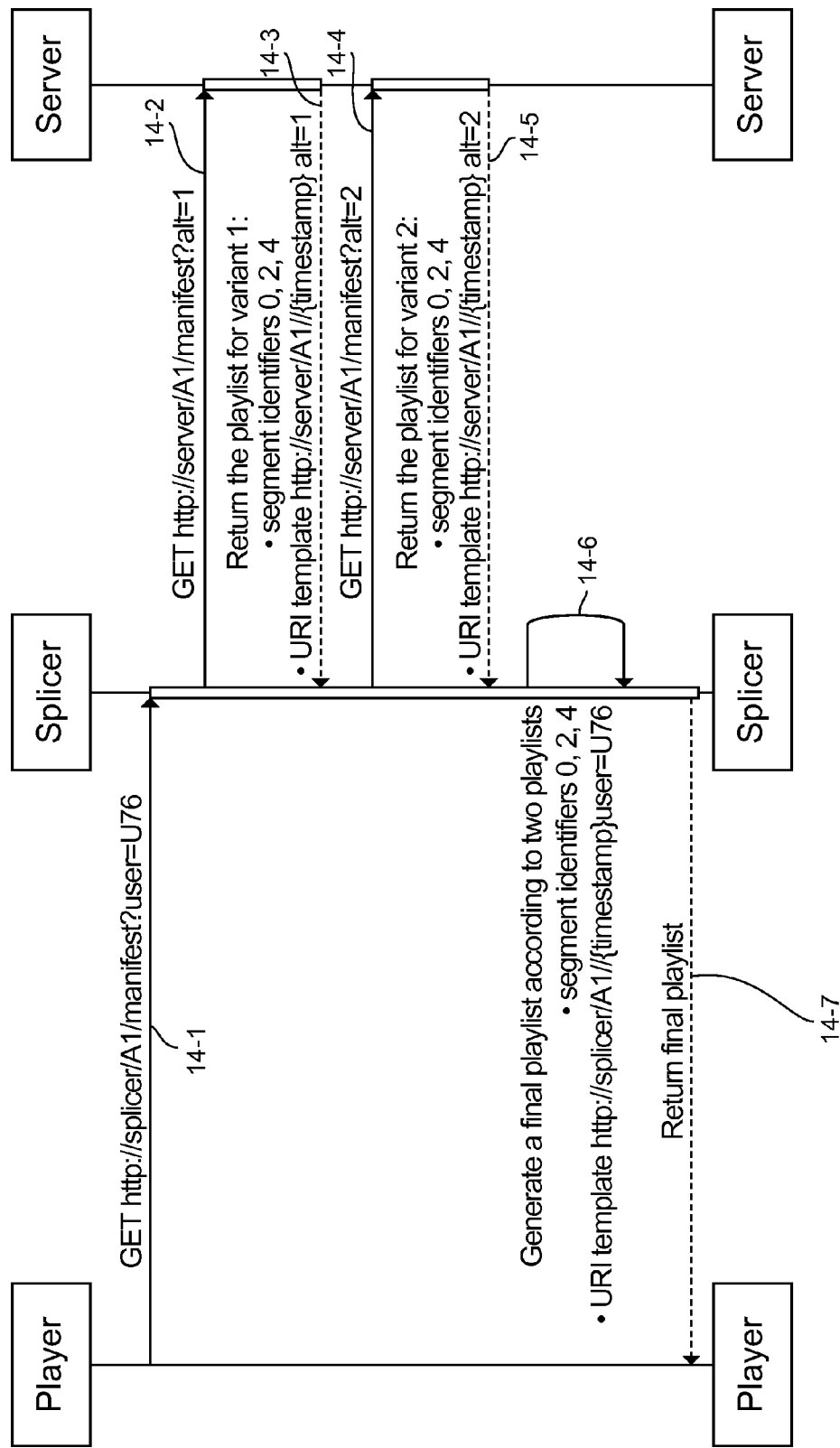
Figure 15:
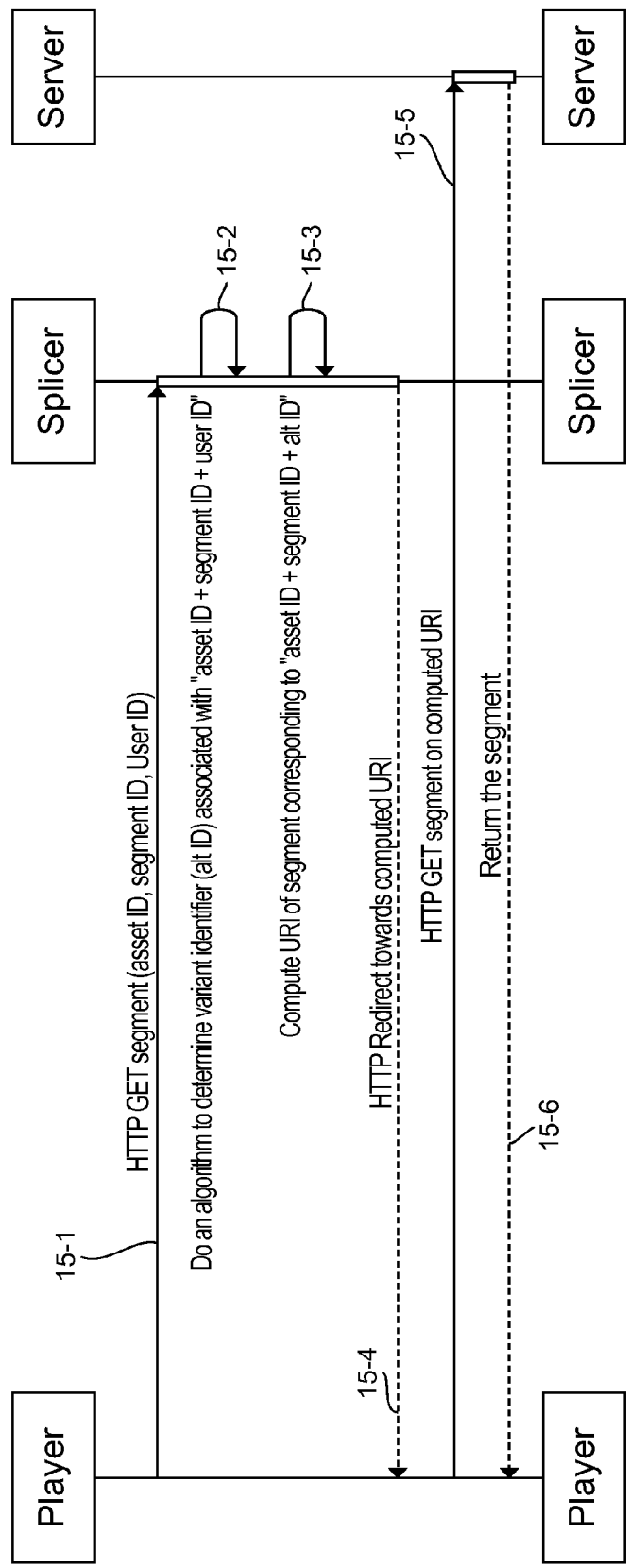
Figure 16:
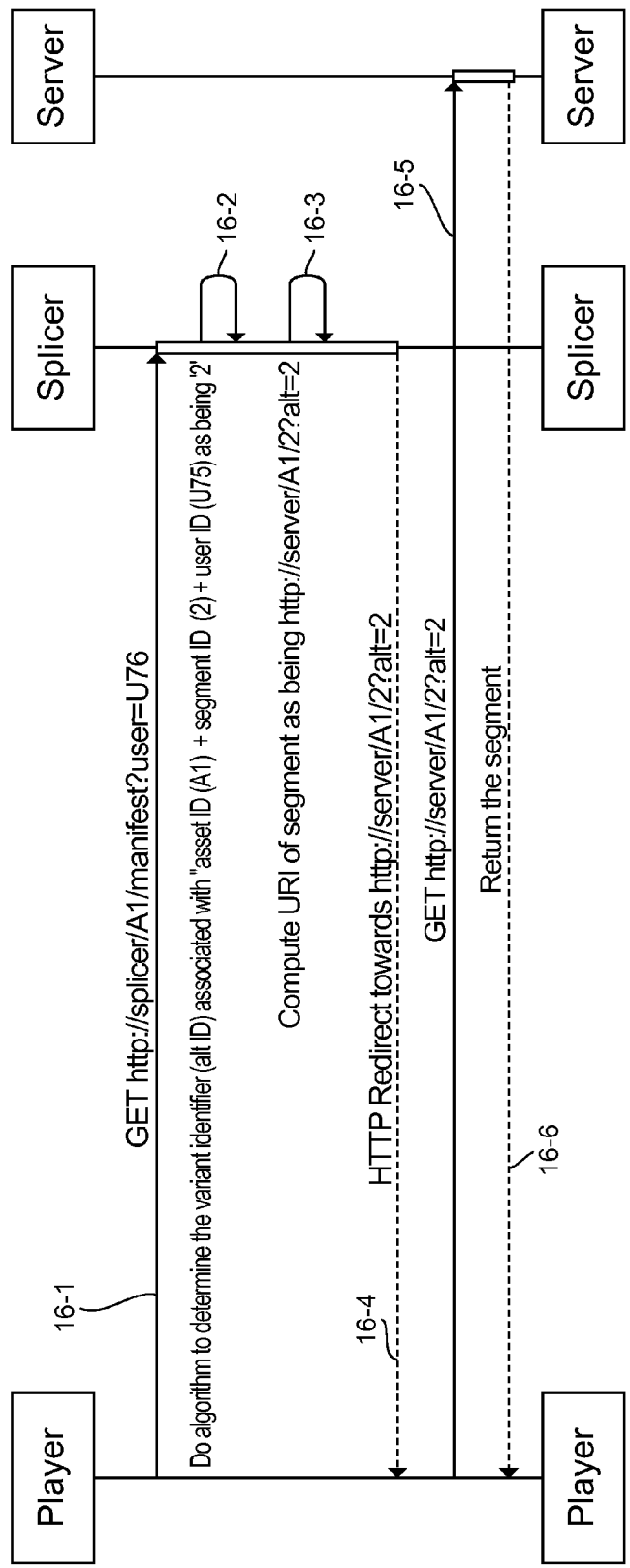
Figure 17:
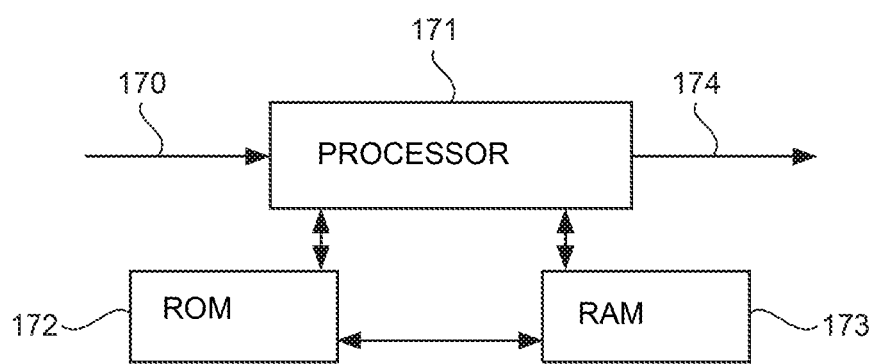
Figure 11:
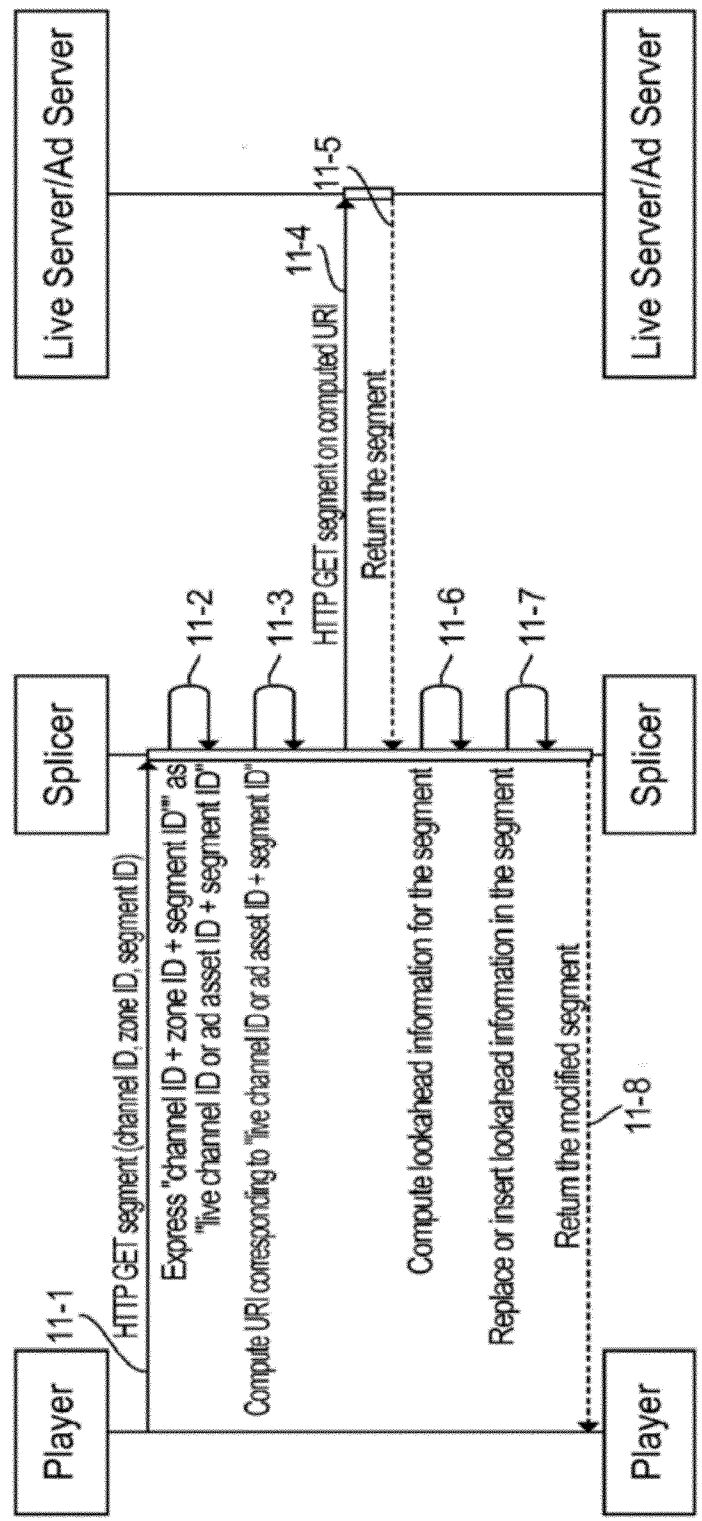

Other features and advantages of the invention shall appear from the following description, given by way of an indicative and non-exhaustive example and from the appended drawings of which, FIGS. 1 and 2 each present a sequence diagram illustrating the management, generically (FIG. 1) or through an example (FIG. 2), of an HTTP GET Playlist request in an ad insertion application for inserting advertisements in a VOD content according to one particular embodiment of the invention;

FIGS. 3 and 4 each present a sequence diagram illustrating the management, generically (FIG. 3) or through an example (FIG. 4), of an HTTP GET Segment request in an ad insertion application for inserting advertisements in a VOD content according to the particular embodiment of the invention in the "Redirect" mode;

FIGS. 5 and 6 each present a sequence diagram illustrating the management, generically (FIG. 5) or through an example (FIG. 6), of an HTTP GET Segment request in an application for inserting advertisements in a VOD content according to a particular embodiment of the invention in "Proxy" mode;

FIGS. 7 and 8 each present a sequence diagram illustrating the management, generically (FIG. 7) or through an example (FIG. 8), of an HTTP GET Playlist request in an ad insertion application for inserting advertisements in a live content according to one particular embodiment of the invention;

FIGS. 9 and 10 each present a sequence diagram illustrating the management, generically (FIG. 9) or through an example (FIG. 10), of an HTTP Get Segment request in an ad insertion application for inserting advertisements in a live content according to one particular embodiment of the invention in "Redirect" mode;

FIGS. 11 and 12 each present a sequence diagram illustrating the management, generically (FIG. 11) or through an example (FIG. 12), of an HTTP Get Segment request in an ad insertion application for inserting advertisements in a live content, according to one particular embodiment of the invention in "Proxy" mode;

FIGS. 13 and 14 each present a sequence diagram illustrating the management, generically (FIG. 13) or through an example (FIG. 14), of an HTTP Get Playlist request in a watermarking application according to one particular embodiment of the invention;

FIGS. 15 and 16 each present a sequence diagram illustrating the management, generically (FIG. 15) or through an example (FIG. 16), of an HTTP Get Segment request in a watermarking application according to one particular embodiment of the invention, in "Redirect" mode;

FIG. 17 presents the structure of the splicer according to one particular embodiment of the invention.

6. DETAILED DESCRIPTION

In all the figures of the present document, the identical elements and steps are designated by equivalent numerical references.

6.1 Application for Ad Insertion in a VOD Content 6.1.1 Management of an HTTP GET Playlist Request (FIGS. 1 and 2)

Referring now generically (with FIG. 1) and then through an example (with FIG. 2), we present the management of an HTTP GET Playlist request in an application for inserting advertisements into a VOD content according to one particular embodiment of the invention.

Each of the FIGS. 1 and 2 presents a sequence diagram involving the following entities:

a player or player which sends get-playlist requests (HTTP GET Playlist requests) and get-segment requests (HTTP GET Segment request). The player plays the playlists and the segments obtained;

an intermediate device or splicer which acts as an intermediary between the player and the VOD server for certain requests, especially those pertaining to playlists and segments. In one variant (not shown), this splicer can be replaced by a first splicer, in charge especially of managing GET Playlist requests (HTTP GET Playlist), and a second splicer, in charge especially of managing GET Segment requests (HTTP GET Segment);

a VOD server which receives segments of contents resulting from a segmentation of contents carried out by a segmenter (itself placed downstream from an encoder). It places the playlists and the segments at the disposal of the player and the splicer. In one variant (not shown), this VOD server can be replaced by a first VOD server in charge especially of managing an HTTP GET Playlist request and a second VOD server in charge especially of managing the HTTP GET Segment requests;

an ad server which places the playlists and the segments relating to the advertisement contents at the disposal of the player and the splicer. In one variant (not shown), this ad server can be replaced by a first ad server in charge especially of managing the GET Playlist requests (HTTP GET Playlist) and a second ad server in charge especially of managing requests for getting segments (HTTP GET Segment); and an ad decision server (ADS) which, depending on the identifiers of the geographical zone or the user identifiers, provides ad break placement opportunity information).

A content delivery network (CDN) can be implemented between the above-mentioned entities. Since this CDN is transparent relative to the mechanisms described here below, it is not discussed here below. Purely for the sake of simplifying the description, it shall therefore be considered here below that the player directly transmits its HTTP requests to the splicer, to the VOD server and to the ad server.

The steps of the generic case of FIG. 1 are now presented.

At a step 1-1, the player sends the splicer a get-playlist request, HTTP GET Playlist request (asset ID, zone ID), parameterized with an identifier of the desired VOD content ("asset ID") and a group identifier such as for example a geographical zone identifier associated with the player ("zone ID"). This last-named parameter makes it possible to decide which ad contents are to be delivered to the player.

At a step 1-2, the splicer sends the VOD server an HTTP GET Playlist request ("asset ID"), parameterized with the desired VOD content identifier ("asset ID").

At a step 1-3, the VOD server sends back the splicer the playlist for the desired VOD content (or initial playlist) with placement opportunity information (referred to as PO for placement opportunities). The initial playlist comprises on the one hand a first URI template pointing towards the VOD server and pre-parameterized with the identifier of the VOD content ("asset ID") and on the other hand a first list of VOD segment identifiers. Each VOD segment identifier of the first list makes it possible, when it is used as a parameter of the first template, to generate a URI pointing towards a VOD segment (of said VOD content).

For each piece of placement opportunity information defined by an identifier (PO ID), the method comprises the following steps:

At a step 1-4, the splicer interrogates the ADS (ad decision server) in providing it with the placement opportunities identifier (PO ID) and the geographical zone identifier ("zone ID"), to know the identifier of the ad content (ad asset ID) to be inserted for this geographical zone;

At a step 1-5, the ADS returns the ad content identifier (ad asset ID) to the splicer;

At a step 1-6, the splicer transmits an HTTP GET Playlist request (ad asset ID) to the ad server; this request is parameterized with the identifier of the ad content (ad asset ID);

At a step 1-7, the ad server returns the playlist for the ad content to the splicer. Each playlist of an ad content comprises, on the one hand, a third URI template pointing towards the ad server and pre-parameterized with the identifier of the ad content and, on the other hand, a third list of ad segment identifiers. Each ad segment identifier makes it possible, when used as a parameter of the third template, to generate a URI pointing towards an ad segment (of said ad content).

Then, At a step 1-8, the splicer generates a final playlist in combining the playlist for the desired VOD content (cf. step 1-3) (or "initial playlist") and the playlist for the ad contents (cf. step 1-7) according to the placement opportunity information. The final playlist comprises, on the one hand a second URI template pointing towards the splicer and pre-parameterized with the identifier of the VOD content and the geographical zone identifier and, on the other hand, a second list of virtual segment identifiers. This second list of virtual segment identifiers is obtained by combining the first list of VOD segment identifiers (included in the initial playlist) and the third list or lists of ad segment identifiers (each included in a playlist of an ad content). Each virtual segment identifier ("segment ID") of the second list makes it possible, when it is used as a parameter of the second template, to generate a URI pointing towards one of the virtual segments associated either with a VOD segment or with an ad segment.

At the step 1-8, the splicer furthermore stores information on associations between virtual segments on the one hand and VOD segments/ad segments on the other hand. These pieces of information on associations will be used subsequently by the splicer in the context of the management of the "HTTP GET Segment" request. More specifically, for each virtual segment identifier of the second list (which identifies an associated virtual segment associated with a given segment: VOD segment or ad segment), the splicer stores a pair associating:

an n-uplet comprising this virtual segment identifier ("segment ID"), the geographical zone identifier ("zone ID") and the VOD content identifier ("asset ID"); and information making it possible to obtain a URI pointing towards the given segment and comprising the following for example:

if the given segment is a VOD segment: the first URI template pointing towards the VOD server (and pre-parameterized with the identifier of the VOD content ("asset ID")), and the identifier of this VOD segment;

if the given segment is an ad segment: the third URI template pointing towards the ad server (in pre-parameterized with the identifier of the ad content ("ad asset ID")) and the identifier of this ad segment.

In one variant (partial storage), the splicer does not store all the above-mentioned pairs but only the information making it possible, in the subsequent phase for managing an HTTP GET Segment request for each identifier of the virtual segment of the second list:

obtain the URI of the desired segment (VOD segment or ad segment), from an n-uplet comprising the virtual segment identifier ("segment ID"), the geographical zone identifier ("zone ID") and the identifier of the first content ("asset ID").

In another variant (without storage), the storage of information is not done. In the subsequent phase for managing a GET Segment request (HTTP GET Segment request), the splicer must again perform certain actions such as, for example, get once again the initial playlist and the playlist or playlists for the ad contents, and then combine them to get the final playlist from which it can retrieve the associations between virtual segments on the one hand and VOD segments/ad segments on the other hand.

At a step 1-9, the splicer transmits the final playlist to the player.

We now present the steps of the example of FIG. 2.

In this example, the identifier of the VOD content ("asset ID") is "titanic", and the geographical zone identifier ("zone ID") is "Z23".

The steps 2-1 to 2-3 correspond to the steps 1-1 to 1-3 of FIG. 1. The player sends the splicer the request for getting the next playlist (GET command followed by a URI):

<<GET http://splicer/titanic/manifest?zone=Z23 >>.

The steps 2-4 to 2-7 correspond to the steps 1-4 to 1-7 of FIG. 1, for a first iteration of the loop, with the placement opportunity P59.

The steps 2-8 to 2-11 correspond to the steps 1-4 to 1-7 of FIG. 1, for a second iteration of the loop, with the placement opportunity P67.

The steps 2-12 and 2-13 correspond to the steps 1-8 and 1-9 of FIG. 1.

At the step 2-3, the first list of VOD segment identifiers (included in the initial playlist) is: 0, 2, 4, 6, 8, which are pieces of timestamp information each indicating a duration of two seconds. The initial playlist comprises two pieces of placement opportunity information (the identifiers of which are "P59" and "P67"): one for the insertion of a first ad content of a six-second duration at the beginning of the VOD content and the other for the replacement (between t=4 and t=8) of a part of the VOD content by a second ad content.

The steps 2-4 to 2-7 make it possible to inform the splicer that the first piece of placement opportunity information (P59) concerns a first ad content (A64) comprising three ad segments of a duration of two seconds each. For this first ad content, the list of ad segment identifiers is: 0, 2, 4 (pieces of timestamp information each indicating a duration of two seconds).

The steps 2-8 to 2-11 make it possible to inform the splicer that the second piece of placement opportunity information (P67) pertains to a second ad content (A78) comprising two ad segments of a duration of two seconds each. For this second ad content, the list of ad segment identifiers is: 0, 2 (timestamp information each indicating a two-second duration).

At a step 2-12, the second list of virtual segment identifiers (included in the final playlist) is: 0, 2, 4, 6, 8, 10, 12, 14 (pieces of timestamp information each indicating a two-second duration), with the following correspondences (associations):
- the virtual segment identifiers 0, 2, 4 correspond to the ad segment identifiers 0, 2, 4 of the list of identifiers for the first ad content (Ad asset #1);
- the virtual segment identifiers 10, 12 correspond to the ad segment identifiers 0. 2 of the list of identifiers for the second ad content (Ad asset #2);
- the virtual segment identifiers 6, 8, 14 correspond to the VOD segment identifiers 0, 2, 8 of the list of identifiers for the VOD content (VOD asset).

With the model for writing each following line: ("virtual segment identifier"="content identifier"|"segment identifier (VOD or ad segment identifier, the above-mentioned correspondences (or mapping) can also be synthesized as follows:
0=Ad asset #1|0
2=Ad asset #1|2
4=Ad asset #1|4
6=VOD asset|0
8=VOD asset|2
10=Ad asset #2|0
12=Ad asset #2|2
14=VOD asset|8

At a step 2-13, the splicer returns the final playlist to the player, this playlist comprising:
the URI template: http://splicer/titanic/{timestamp}?zone=Z23; and
the list of virtual segment identifiers 0, 2, 4, 6, 8, 10, 12, 14.

6.1.2 Management of an HTTP GET Segment Request in "Redirect" (FIGS. 3 and 4)

The management of an HTTP GET Segment request is now presented, generically (with FIG. 3) and then through an example (with FIG. 4), in an ad insertion application for inserting advertisements in a VOD content according to one particular embodiment of the invention, in "Redirect" mode.

The steps of the generic case of FIG. 3 are now presented.

At the step 3-1, the player sends a GET Segment request "HTTP GET segment (asset ID, zone ID, segment ID)" request to the splicer. This request is parameterized with an n-uplet comprising the identifier of the desired VOD content ("asset ID"), the geographical zone identifier ("zone ID") and the identifier of one of the virtual segments (segment ID, which is a piece of timestamp information in the example presented further above) of the final playlist which the splicer has preliminarily transmitted to it (cf. FIGS. 1 and 2).

The fact that the final playlist preliminarily transmitted by the splicer comprises virtual segment identifiers (and not real segment identifiers, VOD segments for example), is transparent for the player. This player has a classic operation based on a classic HTTP request.

At a step 3-2, the splicer identifies the segment (i.e. retrieves the content (VOD or ad content) and the segment identifier (VOD or ad content)) which it has preliminarily associated with the n-uplet with which the segment GET request is parameterized. In other words, the splicer expresses the n-uplet "asset ID+zone ID+segment ID" as a "real asset ID+segment ID" pair, where "real asset ID" is the identifier of the VOD content ("asset ID") or the identifier of the ad content (ad asset ID). To this end, the splicer uses the information on associations stored at the step 1-8 of FIG. 1.

At a step 3-3, the splicer determines a URI pointing towards the segment identified at the step 3-2.

At a step 3-4, the splicer responds to the player with an "HTTP Redirect" type response towards the URI determined at the step 3-3.

At a step 3-5, the player interprets the "HTTP Redirect" type response and then transmits a GET segment request, "HTTP GET segment", pointing towards the URI determined at the step 3-3, i.e. either towards a VOD segment of the VOD server or towards an ad segment of the ad server.

At a step 3-6, the interrogated server (VOD server or ad server) returns the requested segment (VOD segment or ad segment) to the player.

The steps of the example of FIG. 4 are now presented.

In this example, the identifier of the VOD content ("asset ID") is "titanic" and the geographical zone identifier ("zone ID") is "Z23".

The steps 4-1 to 4-6 correspond to the steps 3-1 to 3-6 of FIG. 3 for the processing of a first request in which the player asks for the segment (VOD segment or ad segment) associated with the virtual segment, the identifier of which is 8. At the step 4-1, the player sends the splicer the next get-segment request (GET command followed by a URI): "GET http://splicer/titanic/8?zone=Z23". At the step 4-4, the splicer responds to the player with an "HTTP Redirect" type response towards the URI "http://vodserver/titanic/2" (URI of the VOD segment belonging to the VOD content "titanic" (stored on the VOD server), the identifier of which is 2).

The steps 4-7 to 4-12 correspond to the steps 3-1 to 3-6 of FIG. 3, for the processing of a second request in which the player asks for the segment (VOD segment or ad segment) associated with the virtual segment, the identifier of which is 10. At the step 4-7, the player sends the splicer the next get-segment request (GET command followed by a URI): "GET http://splicer/titanic/10?zone=Z23". At the step 4-10, the splicer responds to the player with an "HTTP Redirect" type response towards the URI "http://adserver/A78/0" (URI of the ad segment belonging to the second ad content "A78" (stored on the ad server), the identifier of which is 0).

6.1.3 Management of an HTTP GET Segment Request in "Proxy" (FIGS. 5 and 6)

The management of an HTTP Get Segment is now presented, generically (with FIG. 5) and then through an example (with FIG. 6), in an ad insertion application for inserting advertisements in a VOD content according to a particular embodiment of the invention in "Proxy" mode.

The steps of the generic case of FIG. 5 are now presented.

The steps 5-1 to 5-3 are identical to the steps 3-1 to 3-3 of FIG. 3.

At the step 5-4, the splicer transmits a request for getting a segment "HTTP GET segment" request pointing towards the URI determined At the step 5-3, i.e. either towards a VOD segment of the VOD server or towards an ad segment of the ad server.

At a step 5-5, the interrogated server (VOD server or ad server) returns the requested segment (VOD segment or ad segment) to the splicer.

At a step 5-6, the splicer returns the requested segment (VOD segment or ad segment) to the player.

The steps of the example of FIG. 6 are now presented.

In this example, the identifier of the VOD content ("asset ID") is "titanic" and the identifier of the geographical zone ("zone ID") is "Z23".

The steps 6-1 to 6-6 correspond to the steps 5-1 to 5-6 in FIG. 5, for the processing of a first request in which the player requests the segment (VOD segment or ad segment) associated with the virtual segment, the identifier of which is 8. At the steps 6-1, the player transmits the next get-segment request (GET command followed by a URI): "GET http://splicer/titanic/8?zone=Z23" to the splicer. At the step 6-4, the splicer transmits the next get-segment request to the VOD server: "GET http://vodserver/titanic/2" (GET commands followed by a URI of the VOD segment belonging to the VOD content "titanic" (stored on the VOD server) and the identifier of which is 2). At the step 6-5, the VOD server returns the obtained segment to the splicer. At the step 6-6, the intermediate server returns the segment obtained to the player.

The steps 6-7 to 6-12 correspond to the steps 5-1 to 5-6 of FIG. 3 for the processing of a second request in which the player requests the segment (VOD segment or ad segment) associated with the virtual segment of which the identifier is 10. At the step 6-7, the player sends the splicer the next get-segment request (GET command followed by a URI): "GET http://splicer/titanic/10?zone=Z23". At the step 6-10, the splicer sends the ad server the next get-segment request: "GET http://adserver/A78/0" (GET command followed by a URI of the ad segment belonging to the second ad content "A78" (stored in the ad server, and the identifier of which is 0). At the step 6-11, the ad server returns the obtained segment to the splicer. At the step 6-12, the splicer returns the obtained segment to the player.

6.2 Ad Insertion Application for Inserting Advertisements in a Live Content 6.2.1 Management of a HTTP GET Playlist Request (FIGS. 7 and 8)

The management of an HTTP GET Playlist request is now presented, generically (with FIG. 7) and then through an example (with FIG. 8), in an ad insertion application for the insertion of advertisements into a live content according to one particular embodiment of the invention.

Each of the FIGS. 7 and 8 presents a sequence diagram involving the same entities as those of FIGS. 1 and 2 except that the VOD server is replaced by a live server.

In this application, the desired content is broadcast live on a channel. It is identified by the identifier of this channel ("channel ID"), complemented if need be by an indication of time period for the desired segments. The indication of time period is optional and can be determined implicitly by the live server.

Different time periods can be defined (especially but not exclusively):

the segment closest to the current time (i.e. the segment most recently generated or the live edge) and the segments up to N seconds behind this segment;

the segments generated between a starting time and an ending time;

the segments generated after a certain starting time and up to the current time (i.e. up to the segment generated most recently).

The steps of the generic case of FIG. 7 are now presented.

At the step 7-1, the player sends the splicer a get-playlist request "HTTP GET playlist (channel ID, zone ID, time period)", parameterized with the identifier of the desired channel ("channel ID"), the identifier of the geographical zone associated with the player ("zone ID") and the indication of a time period.

At a step 7-2, the splicer sends the live server a request asking for a playlist "HTTP GET playlist (channel ID, time period)", parameterized with the identifier of the desired channel ("asset ID") and the indication of a time period.

At a step 7-3, the live server returns the playlist for the desired segments to the splice (i.e. on the desired channel and in the desired time period), with information on placement opportunity (or PO). This playlist is called an initial playlist and comprises on the one hand a first URI template pointing towards the live server and pre-parameterized with the identifier of the desired channel and on the other hand a first list of live segment identifiers. Each live segment identifier of the first list makes it possible, when used a parameter of the first template, to generate a URI pointing towards a live segment (i.e. a segment of the content streamed live direct on the chosen channel).

For each piece of information on placement opportunity defined by an identifier ("PO ID"), the method comprises the steps 7-4 to 7-7 which are identical to the steps 1-4 to 1-7 of FIG. 1.

Then, at a step 7-8, the splicer generates a final playlist in combining the playlist for the desired live segments (cf. step 7-3) (or "initial playlist") and the playlist for the ad contents (cf. step 7-7), according to pieces of information on placement opportunity.

The final playlist comprises on the one hand a second URI template pointing towards the splicer and pre-parameterized with the identifier of the desired channel and the geographical zone identifier and, on the other hand, a second list of virtual segment identifiers. The second list of virtual segment identifiers is obtained by combining the first list of live segment identifiers (included in the initial playlist) and the third list or lists of ad segment identifiers (each included in a playlist of an ad content). Each virtual segment identifier ("segment ID") of the second list makes it possible, when it is used as a parameter of the second template, to generate a URI pointing towards one of the virtual segments associated either with a live segment or with an ad segment.

At a step 7-8, the splicer furthermore carries out the storage of information on the association between virtual segments on the one hand and live/ad segments on the other hand. These pieces of information on associations will be used subsequently by the splicer in the framework of the management of the "HTTP GET Segment" requests. More specifically, for each virtual segment identifier of the second list (which identifies a virtual segment associated with the given segment: live segment or ad segment), the splicer stores a pair associating:

an n-uplet comprising this virtual segment identifier ("segment ID"), the geographical zone identifier ("zone ID") and the channel identifier ("channel ID"); and information used to obtain a URI pointing towards the given segment, and comprising for example the following:

if the given segment is a live segment: the first URI template pointing towards the live server (and pre-parameterized with the identifier of the channel ("channel ID")), and the identifier of this live segment;

if the given segment is an ad segment: the third URI template pointing towards the ad server (and pre-parameterized with the identifier of the ad content ("ad asset ID")), and the identifier of this ad segment.

As in the ad insertion application for inserting advertisements in a VOD content, the "partial storage" or "no storage" variants can be implemented.

At a step 7-9, the splicer transmits the final playlist to the player.

The steps of the example of FIG. 8 are now presented.

In this example, the channel identifier ("channel ID") is "cnn" and the geographical zone identifier ("zone ID") is "Z23".

The steps 8-1 to 8-3 correspond to the steps 7-1 to 7-3 of FIG. 7. The player sends the splicer the request for getting the next playlist (GET command followed by a URI):

"GET http://splicer/cnn/manifest?zone=Z23".

The steps 8-4 to 8-7 correspond to the steps 7-4 to 7-7 of FIG. 7, for an iteration of the loop with placement opportunity P67.

The steps 8-8 and 8-9 correspond to the steps 7-8 and 7-9 of FIG. 7.

At the step 8-3, the first list of live segment identifiers (included in the initial playlist) is: 100, 102, 103,5, 104, 106, 107,5, 108, which are timestamps having, respectively, the durations: 2 s, 1.5 s, 0.5 s, 2 s, 1.5 s, 0.5 s. The initial playlist comprises a piece of information on placement opportunity (of which the identifier is "P67") for the replacement (between t=103,5 and t=107,5) of a part of the live content by an ad content.

The steps 8-4 to 8-7 are used to inform the splicer device that the placement opportunity information ("P67") concerns an ad content ("A78") comprising two ad segments with a duration of two seconds each. For this ad content, the list of ad segment identifiers is: 0, 2 (timestamp information each indicating a duration of 2 s).

At the step 8-8, the second list of virtual segment identifiers (included in the final playlist) is: 100, 102, 103,5, 105,5, 107,5, 108 (timestamp information having, respectively, the durations: 2 s, 1.5 s, 2 s, 2 s, 0.5 s), with the following correspondences (associations):

the virtual segment identifiers 103,5, 105,5 correspond to the ad segment identifiers 0, 2, of the list of identifiers for the ad content ("ad asset");

the virtual segment identifiers 100, 102, 107,5, 108 correspond to the live segment identifiers 100, 102, 107,5, 108 of the list of identifiers for the live content.

With the following model of writing for each line ("virtual segment identifiers"="content identifier"|"(live or ad) segment identifier (duration)"), the above-mentioned mapping can also be synthesized as follows:

100=Live|100 (2 s)
    102=Live|102 (1.5 s)
    103.5=Ad asset|0 (2 s)
    105.5=Ad asset|2 (2 s)
    107.5=Live|107,5 (0.5 s)
    108=Live|108 (2 s)

At the step 8-9, the splicer returns the final playlist to the player, this final playlist comprising:

the URI template: http://splicer/cnn/{timestamp}?zone=Z23; and the list of virtual segment identifiers: 100, 102, 103,5, 105,5, 107,5, 108.

6.2.2 Management of an HTTP GET Segment Request in "Redirect" Mode (FIG. 9 and 10)

The management of an HTTP GET Segment request is now presented, generically (with FIG. 3) and then through an example (with FIG. 4), in an ad insertion application for inserting advertisements in a VOD content according to one particular embodiment of the invention, in "Redirect" mode.

The steps of the generic case of FIG. 9 are now presented.

At a step 9-1, the player transmits a get-segment request to the splicer to get a segment "HTTP GET segment (channel ID, zone ID, segment ID)", parameterized with an n-uplet comprising the identifier of the desired channel ("channel ID"), the geographical zone identifier ("zone ID") and the identifier of one of the virtual segments ("segment ID", which is a piece of timestamp information in the example presented further above) of the final playlist which the splicer has preliminarily transmitted to it (cf. FIGS. 7 and 8).

The fact that the final playlist preliminarily transmitted by the splicer comprises virtual segment identifiers (and not real segment identifiers, live segments for example) is transparent for the player. This device has a classic operation based on classic HTTP requests.

At a step 9-2, the splicer identifies the segment (i.e. it retrieves the content (live or ad content) and the segment identifier (live or ad segment identifier)) which it has preliminarily associated with the n-uplet with which the get-segment request is parameterized. In other words, the splicer expresses the n-uplet "channel ID+zone ID+segment ID" as a "real asset ID+segment ID" pair, where the "real asset ID" is the identifier of the live content ("channel ID") or the identifier of the ad content ("ad asset ID"). To this end, the splicer uses the information on associations stored at the step 7-8 of FIG. 7.

At the step 9-3, the splicer determines a URI pointing towards the segment identified at the step 9-2 and comprising lookahead information. The pieces of lookahead information describe at least one virtual argument which, in a list of virtual segment identifiers (included in the final playlist), follows the virtual segment pointed at by the get-segment request transmitted at the step 9-1.

At the step 9-4, the intermediate segment responds to the player with an "HTTP Redirect" type response towards the URI determined at the step 9-3 (and comprising the lookahead information).

At the step 9-5, the player interprets the "HTTP Redirect" type response and then transmits a get-segment request, "HTTP GET segment", pointing towards the URI determined at the step 9-3 (i.e. either towards a live segment of the live server or towards an ad segment of the ad server) and comprising lookahead information.

At a step 9-6, the interrogated server interprets the lookahead information and obtains a modified segment as follows:

if the interrogated server is the live server, it replaces the lookahead information already present in the live segment by the lookahead information included in the request transmitted at the step 9-5;

if the interrogated server is the ad server, it inserts the lookahead information included in the request transmitted at the step 9-5 into the ad segment.

At a step 9-7, the interrogated server returns the modified segment (modified live segment or modified ad segment) to the player.

At the step 9-6 described here above, the live segments are considered to be chained while the ad segments are not chained. Other configurations can be envisaged: for example, it can be that the live segments are not chained (in this case the player must repeatedly download the playlist); or else, the ad segments can be chained.

In one variant, the lookahead information is omitted from the steps 9-3 to 9-6 if the splicer detects that the segment identified at the step 9-2 and "at least one virtual segment which follows" are both associated with live segments. Indeed, in this case, it is not necessary for the splicer to determine lookahead information or that this information is transmitted at the steps 9-4 and 9-5 since it is identical to the lookahead information which the interrogated server (live server in this case) will place in the live segment before returning it to the player.

In another variant, the chaining is done without explicit lookahead information. The chaining is then implicit: for example, the identifier of the next virtual segment (in the list of virtual segment identifiers of the final playlist) is a piece of timestamp information obtained (by the player) from the duration of the current virtual segment (identified at the step 9-2) (this duration being written in the current virtual segment). In this variant, no additional mechanism relating to the chaining is necessary in the context of the present invention.

The steps of the example of FIG. 10 are now presented.

In this example, the channel identifier ("channel ID") is "cnn" and the geographical zone identifier ("Zone ID") is "Z23".

Taking up the example of FIG. 8 again, the lookahead information (carried in two following segments) for the live segments are:

for the live segment having the identifier 100: 102 (1.5 s), 103,5 (0.5 s);
for the live segment having the identifier 102: 103 (0.5 s), 104 (2 s);
for the live segment having the identifier 103,5: 104 (2 s), 106 (1.5 s);
for the live segment having the identifier 104: 106 (1.5 s), 107,5 (0.5 s);
for the live segment having the identifier 106: 107,5 (0.5 s), 108 (2 s);
for the live segment having the identifier 107,5: 108 (2 s), 110 (2 s);
for the live segment having the identifier 108: 110 (2 s), 112 (2 s).

The lookahead information (pertaining to two following segments) for the virtual segments are:

for the live segment having the identifier 100: 102 (1,5 s), 103.5 (2 s);
for the live segment having the identifier 102: 103,5 (2 s), 105,5 (2 s);
for the live segment having the identifier 103.5: 105,5 (2 s), 107,5 (0.5 s);
for the live segment having the identifier 105.5: 107,5 (0.5 s), 108 (2 s);
for the live segment having the identifier 107.5: 108 (2 s), 110 (2 s);
for the live segment having the identifier 108: 110 (2 s), 112 (2 s).

The steps 10-1 to 10-7 correspond to the steps 9-1 to 9-7 of FIG. 9, for the processing of a first request in which the player asks for the segment (live segment or ad segment) associated with the virtual segment whose identifier is 102. At the step 10-1, the player transmits the request for getting the next segment to the splicer (GET command followed by a URI): "GET http://splicer/cnn/102?zone=Z23". At the step 10-4, the splicer responds to the player with a response of the type "HTTP Redirect" towards the URI "http://liveserver/cnn/102?la=103.5,2,105.5,2" (URI of the live segment belonging to the "cnn" channel and the identifier of which is 102; with, in addition, lookahead information on the following two virtual segments: the first segment possesses the identifier 103,5 (duration 2 s) and the second possesses the identifier 105,5 (duration 2 s)). At a step 10-6, the live server replaces the lookahead information already present in the live segment (the identifier of which is 102) by lookahead information ("103.5,2,105.5,2"), in the live segment requested.

The steps 10-8 to 10-14 correspond to the steps 9-1 to 9-7 of FIG. 9, for the processing of a second request in which the player requests the segment (live segment or ad segment) associated with the virtual segment, the identifier of which is 105,5. At the step 10-8, the player transmits to the splicer the request for getting the next segment (GET command followed by a URI): "GET http://splicer/cnn/105,5?zone=Z23". At the step 10-11, the splicer responds to the player with an "HTTP Redirect" type response towards the URI "http://adserver/A78/2?la=107.5,0.5,108,2" (URI of the ad segment belonging to the ad content "A78", and the identifier of which is 2; with, in addition, pieces of lookahead information for the two following virtual segments: information of the segment for which the identifier is 107,5 (duration 0.5 s) and information for which the identifier is 108 (duration 2 s)). At the step 10-13, the ad server inserts the lookahead information ("107.5,0.5,108,2") into the ad segment requested.

6.2.3 Management of an HTTP GET Segment Request in "Proxy" Mode (FIG. 11 and 12)

The management of an HTTP Get Segment is now presented, generically (with FIG. 11) and then through an example (with FIG. 12), in an ad insertion application for inserting advertisements in a VOD content according to a particular embodiment of the invention in "Proxy" mode.

The steps of the generic case of FIG. 11 are now presented.

The steps 11-1 and 11-2 are identical to the steps 9-1 and 9-2 of FIG. 9.

At a step 11-3, the splicer determines a URI pointing towards the segment identified at the step 11-2 (no insertion or replacement of lookahead information at this stage, unlike at the step 9-3 of FIG. 9).

At a step 11-4, the splicer sends a get-segment request "HTTP GET segment" pointing towards the URI determined at the step 11-3, i.e. either towards a live segment of the live server or towards an ad segment of the ad server.

At a step 11-5, the interrogated server (live server or ad server) returns the requested segment (live segment or ad segment) to the splicer.

At a step 11-6, the splicer determines the pieces of lookahead information that describe at least one virtual segment which, in the list of virtual segment identifiers (included in the final playlist), follows the virtual segment pointed at by the get-segment request transmitted at the step 11-1.

At a step 11-7, the splicer obtains a modified segment by placing the lookahead information (determined at the step 11-6) in the segment returned at the step 11-5. If the returned segment is a live segment, this is a replacement of the lookahead information already present in the live segment by the lookahead information determined at the step 11-6. If the return segment is an ad segment, this is an insertion of the lookahead information determined at the step 11-6.

At the step 11-7 described here above, the live segments are considered to be lookahead segments, while the ad segments are not lookahead segments. Other configurations can be envisaged: for example, it can be that the live segments are not stringed segments (in this case, the player must repeatedly download the playlist); or else the ad segments can be stringed segments.

In one variant, the pieces of lookahead information are omitted at the steps 11-6 and 11-7 if the splicer detects that the segment identified at the step 11-2 and the "at least one virtual segment that follows" are all associated with live segments. Indeed, in this case, it is not necessary for the splicer to determine pieces of lookahead information since they are identical with the lookahead information that the interrogated server (live server in this case) has given to the splicer at the step 11-5.

In another variant, the chaining is done without explicit lookahead information. The chaining is always implicit: for example the following virtual segment identifier (in the list of virtual segment identifiers of the final playlist) is a piece of timestamp information obtained (by the player) from the duration of the current virtual segment (identified at the step 11-2) (this duration being written in the current virtual segment). In this variant, no additional mechanism pertaining to the chaining is needed in the context of the present invention.

At a step 11-8, the splicer returns the modified segment (modified at the step 11-7) to the player.

The steps of the example of FIG. 12 are now presented.

In this example, the channel identifier (<<channel ID>>) is <<cnn>> and the geographical zone identifier (<<Zone ID>>) is <<Z23>>.

The steps 12-1 to 12-8 correspond to the steps 11-1 to 11-8 of FIG. 11, for the processing of a first request in which the player requests the segment (live segment or ad segment) associated with the virtual segment, the identifier of which is 102. At the step 12-1, the player sends the splicer the request for getting the next segment (GET command followed by a URI): "GET http://splicer/cnn/102?zone=Z23". At a step 12-4, the splicer sends the live server the request for getting the next segment: "GET http://liveserver/cnn/102" (GET command followed by a URI of the live segment belonging to the "cnn" channel (provided by the live server) the identifier of which is 102). At the step 12-5, the live server returns the requested segment to the splicer. At the step 12-6, the splicer determines, for the virtual segment whose identifier is 102, the timestamp information on the next two virtual segments: the first one has the identifier 103,5 (duration 2 s) and the second one has the identifier 105,5 (duration 2 s). At the step 12-7, the splicer replaces the lookahead information already present in the live segment (received at the step 12-5) by the lookahead information ("103.5,2,105.5,2") determined at the step 12-6. At the step 12-8, the splicer returns the modified live segment resulting from the step 12-7 to the player.

The steps 12-9 to 12-16 correspond to the steps 11-1 to 11-8 of FIG. 11, for the treatment of a second request in which the player asks for the segment (live segment or ad segment) associated with the virtual segment whose identifier is 105,5. At the step 12-9, the player transmits to the splicer the next get-segment request (GET command followed by a URI): "GET http://splicer/cnn/105,5?zone=Z23". At the step 12-12, the splicer transmits to the ad server the next get-segment request: "GET http://adserver/A78/102" (GET command followed by a URI of the ad segment belonging to the ad content "A78" (stored by the ad server) and the identifier of which is 105,5). At the step 12-13, the ad server returns to the splicer the requested ad segment. At the step 12-14, the splicer determines, for the virtual segment whose identifier is 1015,5, the timestamp information on the two following virtual segments: the first segment has the identifier 107,5 (duration 0.5 s) and the second segment has the identifier 108 (duration 2 s). At the step 12-15, the splicer inserts, into the ad segment (received at the step 12-13), the lookahead information ("107.5,0.5, 108,2") determined at the step 12-14. At the step 12-16, the splicer returns the modified live segment resulting from step 12-15 to the player.

6.3 Program Substitution Application ("Geographical Blackout")

A program substitution application is now presented according to one particular embodiment of the invention. This application is also called a "geographical blackout application" or "sports blackout" application.

Its principle is similar to that of the ad insertion application for inserting advertisements into a live content (cf. FIGS. 7 to 12), except that:

rather than use a placement opportunity information present in the initial playback list relating to content streamed live on a channel to indicate the possibilities of placement of advertisement in the content;

the splicer uses blackout information present in the initial playlist on the live broadcast content broadcast live on a channel to indicate whether this content must be blacked out and replaced by a substitution content.

For each blackout period, a piece of blackout information (possessing an identifier ("blackout ID")) indicates those segments of the requested channel that belong to this blackout period. The role of the splicer is to ensure that the players of a certain geographical zone do not receive the segments of the channel requested but instead receive segments of another content (for example segments of another channel).

The man differences with the ad insertion application for inserting advertisements in a live content are:

the duration (i.e. the finishing time) of the blackout period is generally unknown at the time when the splicer needs to replace the content whereas for the insertion for an advertisement, the placement opportunity information is known in advance;

the content is not replaced for most of the geographical zones while, for the insertion of an advertisement, the replacement is more or less systematic;

the content to be blacked out is generally replaced by another live stream rather than by one or more ad contents of a finite duration. However, the content to be blocked can also be replaced by a VOD content played in a loop (which simulates a live content);

the program substitution application is applied only in the case of "live" broadcasting and not in the VOD case.

This application introduces a new entity: a blackout decision server or BDS but it is equivalent to the ADS (ad decision server) in the ad insertion application.

The working of the program substitution application is described here below only briefly because it is deduced from that of the ad insertion application in a live content presented in detail here above with reference to FIGS. 7 to 12. The operation passes from one to the other in replacing the ADS server by the BDS server in eliminating the ad server and replacing the placement opportunity information by blackout information. This is why there are no figures specific to the program substitution application.

6.3.1 Management of an HTTP GET Playlist Request

The player sends the splicer a get-playlist request, "HTTP GET playlist (channel ID, zone ID, time period)", parameterized with the identifier of the desired channel ("channel ID"), the geographical zone identifier associated with the player ("zone ID) and the indication of the time period.

Then, the splicer transmits a get-playlist request, "HTTP GET playlist (channel ID, time period)", to the live server. This request is parameterized with the identifier of the desired channel ("asset ID") and the indication of the time period.

The live server returns the playlist to the intermediate server for the live segments desired (i.e. on the desired channel and in the desired time period) with blackout information. These playlists are called "initial playlists".

For each piece of blackout information defined by an identifier ("blackout ID"), the splicer interrogates the decision server BDS (in providing the "blackout ID" and "zone ID" identifiers. In return, the decision server informs the splicer whether the player must receive a substitution content and if this is the case which one it must receive in specifying the channel identifier ("channel ID") if it is a live content (the substitution channel and the original channel can be provided by the same live server or by distinct servers), or the content identifier ("asset ID") if it is a VOD content (given by a VOD server).

Then, the splicer generates a final playlist. To this end, it determines the segment within the substitution content that is the closest in terms of "wall-clock time" (or real-world time) to the first segment located in the blackout period. Then, to get the list of virtual segment identifiers (included in the final playlist), the splicer removes (from the list of segment identifiers included in the initial playlist), the segment identifiers ("timestamps") which are in the blackout range and replaces them by segment identifiers ("timestamps") of the substitution content.

For example:
if the initial playlist contains the segment identifiers 100, 102, 104, 106, 108, 110,
if the segments 104, 106 are in the blackout period, and
if the playlist of the substitution content contains the segment identifiers 200, 202, 204, 205,5, 207,5, 209,5, with the segment whose identifier is 204 corresponding to the segment that is the closest in "wall-clock time" to the first segment of the blackout period (i.e. the segment whose identifier is 100);
then the final playlist contains the virtual segment identifiers 100, 102, 104, 105,5, 108, 110, with the following correspondences (associations):
the virtual segment identifiers 100, 102, 108, 110 correspond to the live segment identifiers 100, 102, 108, 110 contained in the initial playlist;
the virtual segment identifiers 104, 105,5 correspond to the substitution segment identifiers 204, 205,5 of the playlist of the substitution content (computation details: 104=204+(104−204) and 105,5=205,5+(104−204)).
With the following model for writing each line: ("virtual segment identifiers"="content identifier"|"segment identifier (live or substitution segment) (duration)") the correspondences (mapping) mentioned here above can also be synthesized as follows:

100=Live|100 (2 s)
102=Live|102 (2 s)
104=Replace|204 (1.5 s)
105,5=Replace|205,5 (2 s)
108=Live|108 (2 s)
110=Live|110 (2 s)

Finally, the splicer transmits the final playlist to the player.

6.3.2 Management of an HTTP GET Segment Request (in "Redirect" Mode or "Proxy" Mode)

The player sends the splicer a get-segment request "HTTP GET segment (channel ID, zone ID, segment ID)", parameterized with an n-uplet comprising the identifier of the desired channel ("channel ID"), the geographical zone identifier ("zone ID") and the identifier of one of the virtual segments ("segment ID") of the final playlist which the splicer has preliminarily transmitted to it.

The splicer identifies the segment (i.e. retrieves the content (live or substitution content) and the segment identifier (live or substitution segment identifier)) which it has preliminarily associated with the n-uplet with which the get-segment request is parameterized.

The splicer determines a URI pointing towards the identified segment. It also determines pieces of lookahead information describing at least one virtual segment which, in the list of virtual segment identifiers (included in the final playlist), follows the virtual segment pointed at by the get-segment request.

As in the ad insertion application for inserting advertisements in a live content, two modes can be envisaged to enable the player to receive the requested segment (live segment or substitution segment), after modification of this segment (so that it contains lookahead information): the "Redirect" mode (cf. FIGS. 9 and 10) and the "Proxy" mode (cf. FIGS. 11 and 12).

In the "Redirect" mode, the splicer responds to the player with a "HTTP Redirect" type response towards the determined URI (pointing towards the identified segments and comprising lookahead information). The player interprets the "HTTP Redirect" type response, then transmits a get-segment request "HTTP GET segment" request pointing towards the determined URI. The interrogated server (pointed at by the determined URI) interprets the lookahead information and obtains a modified segment containing the lookahead information received with the determined URI. Finally, the interrogated server returns the modified segment to the player.

In the "Proxy" mode, the splicer sends a get-segment request, "HTTP GET segment", pointing towards the determined URI (pointing towards the identified segment). The interrogated server (pointed at by the determined URI) returns the requested segment to the splicer. The splicer obtains a modified segment by placing the lookahead information in the segment returned by the interrogated server. Finally, the splicer returns the modified segment to the player.

6.4 Watermarking Application 6.4.1 Management of an HTTP GET Playlist Request (FIGS. 13 and 14)

The management of an HTTP GET Playlist request is now presented, generically (with FIG. 13) and then through an example (with FIG. 15), in a marking application (also called watermarking) according to one particular embodiment of the invention.

Here above, the following were presented:
an ad insertion application, in which a final playlist is obtained by the splicer in combining an initial playlist (for the VOD content or a live content) and one or more playlists, each for an ad content;

a geographical substitution application ("geographical blackout") in which a final playlist is obtained by the splicer in combining an initial playlist (for a live content) and one or more playlists, each for a substitution content.

In the watermarking application, a final playlist is also obtained for the splicer in combining several playlists. However, this application combines N (with N greater than or equal to 2) playlists relative to N particular contents (here below called a first content and other contents (the term "content" is understood here, as in the above, either as a VOD content or as a live content)):

they possess the same content identifier ("asset ID") here below called a "common content identifier";

they comprise identical segments (same segment content, same duration), except for the presence, in each same-ranking segment of the N contents, of a distinct digital watermark. In other words, the N contents are N variants of a same initial content and are visually identical to the naked eye;

the playlist associated with the first content (i.e. the first variant of the initial content) comprises a first URI template pointing towards a server and pre-parameterized with the common content identifier and a first content variant identifier (al ID=1);

the playlist associated with each other content (i.e. with each other variant of the initial content) comprises another URI template pointing towards the above-mentioned server (or in one variant towards another server) and pre-parameterized with the common content identifier and a second content variant identifier (alt ID=2).

In other words, the segments of the N flows are available at different URIs. for example, in the case N=2, with "A1" being the common content identifier, the first content contains three segments (the segment identifiers of which are 0, 2, 4) with the following URIs:

http://server/A1/v1/0,
http://server/A1/v1/2,
http://server/A1/v1/4, and the second content also contains three segments (the segment identifiers of which are equal to 0, 2, 4) with the following URIs:

http://server/A1/v2/0,
http://server/A1/v2/2,
http://server/A1/v2/4.

In this example, "v1" and "v2" correspond to the first and second content alternative identifiers.

Here above, the playlists associated with the different contents are distinct because each template is pre-parameterized with a content variant identifier that is different. In one variant, they are distinguished from each other because the list of identifiers of segments is different from one playlist to another.

Here below, we present the steps of the generic case of FIG. 13 (in the embodiment where N=2 and the playlist associated with the different contents are distinct each other because each template is pre-parameterized with a content variant identifier that is different).

In a step 13-1, the playlist sends the splicer a request asking for the playlist "HTTP GET playlist (asset ID, user ID)", parameterized with a VOD content identifier ("asset ID") and a group identifier such as for example a user identifier ("user ID"). This last-named parameter makes it possible to decide how the segments that will be provided to the player are to be digitally watermarked.

For each variant of the desired VOD content, defined by an identifier ("alt ID"), the method comprises the following steps:

in a step 13-2, the splicer sends the VOD server a get-playlist request "HTTP GET playlist (asset ID, alt ID)", parameterized with the VOD content identifier ("asset ID") and the said variant identifier ("alt ID");

in a step 13-3, the VOD server returns the playlist to the splicer for said variant of the desired VOD content. This playlist comprises, on the one hand, a URI template pointing towards the VOD server and pre-parameterized with the VOD content identifier ("asset ID") and the identifier of said variant ("alt ID"), and on the other hand a list of VOD segment identifiers. Each VOD segment identifier, when used as a parameter of the above-mentioned template, makes it possible to generate a URI pointing towards a VOD segment of said variant of the VOD content.

Then, in a step 13-4, the splicer generates a final playlist as a function of the playlist of the two variants of the desired VOD content. The final playlist comprises, on the one hand, the second URI template pointing towards the splicer and pre-parameterized with the VOD content identifier ("asset ID") and the user identifier ("user ID") and, on the other hand, a list of virtual segment identifiers. The list of virtual segment identifiers is identical to the two lists (which are themselves mutually identical) of VOD segment identifiers of the two variants of the VOD content. Each virtual segment identifier ("segment ID"), when used as a parameter of the second template, makes it possible to generate a URI pointing towards one of the associated virtual segments associated either with a VOD segment of the first content (i.e. the first variant of the VOD content) or with a VOD segment of the second content (i.e. the second variant of the VOD content).

In a step 13-5, the splicer sends the final playlist to the player.

We now present the steps of the example of FIG. 14.

In this example, the VOD content identifier ("asset ID") is "A1" and the user identifier ("user ID") is "U76".

The step 14-1 corresponds to the step 13-1 of FIG. 13. The player sends the splicer of the next get-playlist request (GET command followed by a URI):

"GET http://splicer/A1/manifest?user=U76".

The steps 14-2 and 14-3 correspond to the steps 13-2 and 13-3 of FIG. 13, for a first iteration of the loop (with "alt ID"=1) for the first content (i.e. the first variant of the VOD content). At the step 14-3, the playlist returned by the server comprises:

the list of segment identifiers: 0, 2, 4, which are the timestamps each indicating a duration of 2 s;
the URI template: http://server/A1/{timestamp}?alt=1.

The steps 14-4 and 14-5 correspond to the steps 13-2 and 13-3 of FIG. 13, for a second iteration of the loop (with "alt ID"=2), for the second content (i.e. the second variant of the VOD content). At the step 14-5, the playlist returned by the server comprises:

the list of segment identifiers: 0, 2, 4 (identical to the list of segment identifiers received at the steps 14-3);
the URI template: http://server/A1/{timestamp}?alt=2

The steps 14-6 and 14-7 correspond to the steps 13-4 and 13-5 of FIG. 13. The final playlist comprises:

the list of virtual segment identifiers: 0, 2, 4 (identical to the two lists of segment identifiers received at the steps 14-3 and 14-5);
the URI template: http://splicer/A1/{timestamp}?user=76

The above explanations, given with reference to FIGS. 13 and 14 in the case of VOD content, can be easily and directly transposed to the case of a content broadcast live on a channel. The VOD content identifier ("asset ID") is then replaced by the identifier of the channel ("channel ID"), complemented if necessary by an indication of the time period ("time period") for the desired segments.

6.4.2 Management of an HTTP GET Segment" request in "Redirect" mode (FIGS. 15 and 16)

The management of an HTTP GET Segment request is now presented, generically (with FIG. 15) and then through an example (with FIG. 16), in a watermarking application according to one particular embodiment of the invention, in "Redirect" mode.

The steps of the generic case of FIG. 15 are now presented.

In a step 15-1, the player sends the splicer a get-segment request, "HTTP GET segment (asset ID, segment ID, user ID)", parameterized with an n-uplet comprising the VOD content identifier ("asset ID"), the user identifier ("user ID") and the identifier of one of the virtual segments ("segment ID", which is a piece of timestamp information in the example presented further above) of the final playlist which the splicer has preliminarily transmitted to it (cf. FIGS. 13 and 14).

The fact that the final playlist preliminarily transmitted by the splicer comprises virtual segment identifiers (and not real segment identifiers, VOD segments for example) is transparent for the player. This device, has a classic operation, based on classic HTTP requests.

In a step 15-2, the splicer determines the variant identifier ("alt ID") associated with the n-uplet with which the get-segment request is parameterized. This variant identifier indicates the content, of the first and second contents, in which the segment to be given to the player is located. It may be recalled that the first content and the second content are two variants of a same initial VOD content. In other words, the splicer expresses (deterministic algorithm), the n-uplet "asset+ID+user ID+segment ID" as "alt ID>>", where "alt ID" is the identifier of the first variant ("alt ID"=1) or the identifier of the second variant ("alt ID"=2).

At a step 15-3, the splicer determines a URI pointing towards the segment identified by the "asset ID" and "segment ID", identifiers as well as by the variant identifier ("alt ID") determined at the step 15-2.

At a step 15-4, the splicer responds to the player with a "HTTP Redirect" type response towards the URI determined at the step 15-3.

At a step 15-5, the player interprets the "HTTP Redirect" type response, then transmits a get-segment request, "HTTP GET segment", pointing towards the URI determined at the step 15-3, i.e. either towards a VOD segment of the first content (i.e. first variant of the VOD content) or to a VOD segment of the second content (i.e. the second variant of the VOD content).

At a step 15-6, the interrogated server returns the requested segment to the player.

Thus, the content really given to the player comprises a succession of segments each watermarked with one of the two marks. This is the equivalent of the transportation, by the content really provided, of a concealed channel where each segment transports a watermarking bit (for example "0" if the segment comes from the first content and "1" if this segment comes from the second content). The successive bits of this concealed channel depend on the deterministic algorithm used by the splicer. This concealed channel enables for example the subsequent verification of the place where the content available to a user comes from.

The steps of the example of FIG. 16 are now presented.

In this example, the content identifier ("asset ID") is "A1" and the user identifier ("user ID") is "U76".

The steps 16-1 to 16-6 correspond to the steps 15-1 to 15-6 of FIG. 15, for the processing of a request in which the player asks for the VOD segment associated with the virtual segment whose identifier is 2.

At the step 16-1, the player sends the splicer the next get-segment request (GET command followed by a URI): "GET http://splicer/A1/2?user=U76". In the step 16-4, the splicer responds to the player with an "HTTP Redirect" type response towards the URI "http://server/A1/2?alt=2" (URI of the VOD segment belonging to the second content (i.e. the second variant of the content "A1" as indicated by "alt=2") and the identifier of which is 2).

The explanations given here above, with reference to FIGS. 15 and 16, in the case of a VOD content, are easily and directly transposable to the case of a content broadcast live on a channel. The identifier of the VOD content ("asset ID") is then replaced by the identifier of the channel ("channel ID"), complemented if necessary by an indication of time period for the desired segments.

With this watermarking application, no mechanism for handling lookahead data is needed in the case of a content streamed live on a channel, unlike the ad insertion application (cf. FIGS. 9 and 10). Indeed, two same-ranking segments of the two contents (for example the two segments, the segment identifier of which is 4) contain the same pieces of lookahead information which therefore do not need to be modified. It can be recalled indeed that the first and second contents contain identical segments, except for the presence in each same-ranking segment of the two contents of a distinct digital watermark.

6.4.3 Management of an HTTP GET Segment Request in "Proxy" Mode

For the management of an HTTP GET segment request, in the application for watermarking a VOD content or a live content, the present invention can also be applied in "Proxy" mode.

This case is not described in detail (or represented in the figures) because it can easily be deduced from the "Redirect" mode case of FIGS. 15 and 16 in the same way as for the application of the ad insertion:

- the "Proxy" mode case of FIGS. 5 and 6 is deduced from the "Redirect" mode case of FIGS. 3 and 4 (for a VOD content), and
- the "Proxy" mode case of FIGS. 11 and 12 is deduced from the "Redirect" mode case of FIGS. 9 and 10 (for a live content).

6.5 Structure of the Splicer (FIG. 17)

FIG. 17 presents the simplified structure of an splicer implementing the method according to the invention (in any one of the particular embodiments described here above with reference to FIGS. 1 to 16). This splicer has a RAM 173, a processing unit 171 equipped for example with a processor and driven by a computer program stored in ROM 172. At initialization, the code instructions of the computer program are for example loaded into the RAM 173 and then executed by the processor of the processing unit 171.

The processing unit 171 inputs various messages 170 coming from the other entities (player, VOD server, live server, ADS server, ad server, live server, etc) and especially get-playlist requests (HTTP GET playlist) and get-segment requests (HTTP GET segment) transmitted by the player.

The processor of the processing unit 171 performs the processing operations needed (according to the instructions of the program 172) and outputs various messages 174 towards the other entities, especially responses to the above-mentioned requests (HTTP GET playlist and HTTP GET segment requests) transmitted by the player.

This FIG. 17 illustrates only one particular manner, among several possible, of performing the different algorithms described in detail here above, with reference to FIGS. 1 to 16. Indeed, the technique of the invention can be carried out equally well:

- on a reprogrammable computing machine (a PC computer, a DSP processor or a microcontroller) executing a program comprising a sequence of instructions, or
- on a dedicated computation machine (for example a set of logic gates such as an FPGA or ASIC or any other hardware module).

Should the invention be implanted on a reprogrammable computing machine, the corresponding program (i.e. the sequence of instructions) could be stored in a detachable storage medium (for example a floppy disk, a CD-ROM or a DVD-ROM) or non-detachable storage medium, this storage medium being partially or totally readable by a computer or a processor.

6.6 Various Alternative Embodiments

It is clear that many other embodiments of the invention can be envisaged. It is possible especially to provide for a variety of alternative embodiments resulting from:

- the order in which the sequence of actions occurs. For example, before the player sends out its get-playlist request (HTTP GET playlist), the splicer can obtain the playlists provided by the servers (VOD server, live server, ad server, etc) and cache them. Similarly, it can cache decisions given by the decision servers (ADS, BDS) in order to prevent identical requests towards these servers;
- certain entities can be merged (for example the functions of the ADS or BDS server can be integrated into the splicer);
- messages can be reversed (for example the servers (VOD server, live server, ad server, etc) can "push" the playlists to the splicer);
- the HTTP protocol can be replaced by another customer-server communications protocol that does not require any specialized server;
- whatever the application, the present invention can be applied with any type of group identifier whatsoever (and not only "zone ID" or "user ID"), provided that it defines a group of at least one user or at least one player. For example, in addition to a geographical zone identifier ("zone ID"), it can be an identifier of a category of users ("men", "women", "premium subscriber", "basic subscriber", etc) or an identifier of a category of players;
- etc.

The invention claimed is:

1. Method for managing personalized playlists of the type comprising a uniform resource identifier template and a list of segment identifiers, wherein the method comprises:
   receiving by a first splicer, from a content delivery network, a get-list request transmitted by a player and parameterized with an identifier of the first content, and a group identifier defining a group comprising at least one user and at least one player;
   a first phase of managing the get-list request by the first splicer, wherein managing includes the following acts performed by a computation machine of the first splicer:
   a) getting an initial playlist comprising: a first uniform resource identifier template pointing towards a first server and pre-parameterized with the identifier of the first content; and a first list of segment identifiers, each segment identifier of the first list enabling, when used as a parameter of the first template, to generate a uniform resource identifier pointing towards a segment of the first content;
   b) building a final playlist comprising: a second uniform resource identifier template pointing towards a second splicer, coinciding or not coinciding with the first splicer, and pre-parameterized with the identifier of the first content and the group identifier; and a second list of virtual segment identifiers, each virtual segment identifier enabling, when used as a parameter of the second template, to generate a uniform resource identifier pointing towards one of said virtual segments, each virtual segment being associated either with a segment of the first content or with an alternative segment of a set of alternative segments included in at least one alternative content;
   c) transmitting the final playlist to the player.

2. Method according to claim 1, wherein the first content belongs to the group comprising video-on-demand contents and live streaming contents.

3. Method according to any one of the claim 1, wherein the act b) comprises an act of storing information enabling, for each virtual segment identifier of the second list that identifies a virtual segment associated with a given segment of the first content or a given segment of said at least one alternative content, to obtain:
   a uniform resource identifier pointing to said given segment,
   the group identifier and the identifier of the first content from an n-uplet comprising said virtual segment identifier of the second list.

4. Method according to claim 1, wherein the initial playlist additionally comprises at least one piece of information on change, relating to the possibility of inserting one or more alternative segments in the first content or of replacing one or more segments of the first content by one or more alternative segments;
   and the act b) comprises the following acts:
   depending on said group identifier and for each piece of information on change, getting a playlist of a given alternative content, comprising: a third uniform resource identifier template pointing towards a server of alternative contents coinciding or not coinciding with the first server and pre-parameterized with the identifier of said given alternative content; and a third list of alternative segment identifiers of said given alternative content;
   creating said second list of virtual segment identifiers, in combining the first list of segment identifiers with the third list or each third list of alternative segment identifiers, as a function of the piece of information on change or of each piece of information on change.

5. Method according to claim 4, wherein the act of getting a playlist list of a given alternative content, as a function of said group identifier and for each piece of information on change, comprises the following acts:
   getting, by means of a decision mechanism internal to the first splicer, or from a decision server, an alternative content identifier, as a function of the group identifier and an identifier of said information on change;

getting said playlist of the given alternative, possessing the alternative content identifier that is got.

6. Method according to claim 4, wherein each alternative content belongs to the group comprising:

video contents, especially advertising contents; and live streaming contents.

7. Method according to claim 4, wherein said at least one piece of information on change is a placement opportunity, indicating a possibility of placing an advert content in the first content.

8. Method according to claim 4, wherein said at least one piece of information on change is a piece of blackout information, indicating a period of blackout during which the first content must be replaced by an alternative content.

9. Method according to claim 1, wherein the identifier of each alternative content is identical to the identifier of the first content, the first content and each alternative content comprise identical segments except for the presence, in each same-ranking segment of said first content and of said alternative content, of a distinct digital watermark and each alternative content is associated with another distinct playlist, comprising: another uniform resource identifier template; and another list of identifiers of alternative segments of said alternative content, and each other playlist is distinguished from the initial playlist:

in that the first uniform resource identifier template is pre-parameterized with a content variant identifier that is different from another content variant identifier with which said other uniform resource identifier template is pre-parameterized; and/or in that the first list of segment identifiers is different from said other list of segment identifiers.

10. Method according to claim 1, wherein the method comprises a second phase for managing, by means of a the second splicer, a get-segment request transmitted by the player and parameterized with the identifier of the first content, the group identifier and one of said virtual segment identifiers, the second phase comprising the following acts:

i) identifying a segment as a function of the parameters of said get-segment request, the identified segment being either a segment of said first content or an alternative segment of said at least one alternative content;

ii) determining a uniform resource identifier pointing towards the identified segment; and iii-a) transmitting the determined uniform resource identifier to the player; or iii-b) transmitting the segment pointed at by the determined uniform resource identifier to the player.

11. Method according to claim 10, wherein the act b) comprises an act of storing information enabling, for each virtual segment identifier of the second list that identifies a virtual segment associated with a given segment of the first content or a given segment of said at least one alternative content, to obtain:

a uniform resource identifier pointing to said given segment, the group identifier and the identifier of the first content from an n-uplet comprising said virtual segment identifier of the second list; and wherein, at the act i) the second splicer uses the information preliminarily stored in the storage act.

12. Method according to claim 10, wherein the act b) comprises an act of storing information enabling, for each virtual segment identifier of the second list that identifies a virtual segment associated with a given segment of the first content or a given segment of said at least one alternative content, to obtain:

a uniform resource identifier pointing to said given segment, the group identifier and the identifier of the first content from an n-uplet comprising said virtual segment identifier of the second list; and wherein, at the act i), the second splicer executes a deterministic algorithm which inputs the identifier of the first content, the group identifier, and the virtual segment identifier with which the get-segment request is parameterized and which outputs the identified segment.

13. Method according to claim 10, wherein the initial playlist additionally comprises at least one piece of information on change, relating to the possibility of inserting one or more alternative segments in the first content or of replacing one or more segments of the first content by one or more alternative segments;

wherein the act b) comprises the following acts:

depending on said group identifier and for each piece of information on change, getting a playlist of a given alternative content, comprising: a third uniform resource identifier template pointing towards a server of alternative contents coinciding or not coinciding with the first server and pre-parameterized with the identifier of said given alternative content; and a third list of alternative segment identifiers of said given alternative content;

creating said second list of virtual segment identifiers, in combining the first list of segment identifiers with the third list or each third list of alternative segment identifiers, as a function of the piece of information on change or of each piece of information on change;

wherein the second phase additionally comprises an act of getting lookahead information describing at least one virtual segment which, in the second list of virtual segment identifiers, follows the virtual segment pointed at by said get-segment request;

wherein the act iii-a) is preceded by a copying act of copying, by insertion or replacement, of said lookahead information in the uniform resource identifier pointing towards the identified segment;

and wherein, in response to a get-segment request transmitted by the player and parameterized with the uniform resource identifier transmitted by the second splicer, the first server or the alternative content server, by insertion or replacement, copies said lookahead information into the identified segment and then transmits the lookahead information to the player.

14. Method according to claim 10, wherein the initial playlist additionally comprises at least one piece of information on change, relating to the possibility of inserting one or more alternative segments in the first content or of replacing one or more segments of the first content by one or more alternative segments;

wherein the act b) comprises the following acts:

depending on said group identifier and for each piece of information on change, getting a playlist of a given alternative content, comprising: a third uniform resource identifier template pointing towards a server of alternative contents coinciding or not coinciding with the first server and pre-parameterized with the identifier of said given alternative content; and a third list of alternative segment identifiers of said given alternative content;

creating said second list of virtual segment identifiers, in combining the first list of segment identifiers with the third list or each third list of alternative segment identifiers, as a function of the piece of information on change or of each piece of information on change;

wherein the second phase additionally comprises an act of getting lookahead information describing at least one virtual segment which, in the second list of virtual segment identifiers, follows the virtual segment pointed at by said get-segment request; and wherein the act iii-b) output is preceded by an act of copying, by insertion or replacement, of said lookahead information in the segment pointed at by the determined uniform resource identifier.

15. Method according to claim 10,
wherein the identifier of each alternative content is identical to the identifier of the first content;
wherein the first content and each alternative content comprise identical segments except for the presence, in each same-ranking segment of said first content and of said alternative content, of a distinct digital watermark;
wherein each alternative content is associated with another distinct playlist, comprising: another uniform resource identifier template; and another list of identifiers of alternative segments of said alternative content;
wherein each other playlist is distinguished from the initial playlist:
  in that the first uniform resource identifier template is pre-parameterized with a content variant identifier that is different from another content variant identifier with which said other uniform resource identifier template is pre-parameterized; and/or
  in that the first list of segment identifiers is different from said other list of segment identifiers; and
wherein, at the act i) the second splicer executes a deterministic algorithm which inputs the identifier of the first content, the group identifier and the identifier of the virtual segment pointed at, and which outputs a piece of information indicating whether the segment associated with the virtual segment pointed at by said get-segment request is a segment of the first content or an alternative segment.

16. Computer-readable and non-transient storage medium storing a computer program comprising a set of instructions executable by a computer or processor to implement a method for managing by a computing machine of a first splicer, personalized playlists of the type comprising a uniform resource identifier template and a list of segment identifiers, when the instructions are executed by the computing machine, the method comprising:
  receiving from a content delivery network a get-list request transmitted by a player and parameterized with an identifier of the first content, and a group identifier defining a group comprising at least one user and at least one player;
  a first phase of managing the get-list request by the computing machine of the first splicer, the first phase comprising the following acts:
  a) getting an initial playlist comprising: a first uniform resource identifier template pointing towards a first server and pre-parameterized with the identifier of the first content; and a first list of segment identifiers, each segment identifier of the first list enabling, when used as a parameter of the first template, to generate a uniform resource identifier pointing towards a segment of the first content;
  b) building a final playlist comprising: a second uniform resource identifier template pointing towards a second splicer, coinciding or not coinciding with the first splicer, and pre-parameterized with the identifier of the first content and the group identifier; and a second list of virtual segment identifiers, each virtual segment identifier enabling, when used as a parameter of the second template, to generate a uniform resource identifier pointing towards one of said virtual segments, each virtual segment being associated either with a segment of the first content or with an alternative segment of a set of alternative segments included in at least one alternative content; and
  c) transmitting the final playlist to the player.

17. An apparatus comprising a first splicer for managing a personalized playlist of the type comprising a uniform resource identifier template and a list of segment identifiers, wherein the first splicer comprises:
  an input, which receives a get-list request, transmitted by a player over a content delivery network and parameterized with an identifier of a first content and a group identifier identifying a group of at least one user and at least one player;
  means for managing the get-list request, the means for managing comprising:
    means for getting an initial playlist comprising: a first uniform resource identifier template pointing towards a first server and pre-parameterized with the identifier of the first content; and, a first list of segment identifiers, each segment identifier of the first list enabling, when it is used as a parameter of the first template, to generate a uniform resource identifier pointing towards a segment of the first content;
    means for building a final playlist, comprising: a second uniform resource identifier template pointing towards a second splicer, coinciding or not coinciding with the first splicer and pre-parameterized with the identifier of the first content and the group identifier; and, a second list of virtual segment identifiers, each virtual segment identifier enabling, when is used as a parameter of the second template, to generate a uniform resource identifier pointing towards one of said virtual segments, each virtual segment being associated either with a segment of the first content or with an alternative segment of a set of alternative segments included in at least one alternative content;
    means for transmitting the final playlist to the player;
    computing machine, which implements at least one of the means for getting, the means for building, and/or the means for transmitting.

18. An apparatus comprising a splicer for managing personalized playlists of the type comprising a uniform resource identifier template and a list of segment identifiers, wherein the splicer comprises:
  an input, which receives a get-segment request, transmitted by a player over a content delivery network and parameterized with an identifier of a first content, a group identifier identifying a group of at least one user and at least one player, and a virtual segment identifier:
  means for managing the get-segment request, the means for managing comprising:

a means for identifying a segment as a function of the parameters of said get-segment request, the identified segment being either a segment of said first content or an alternative segment of said at least one alternative content;

means for determining a uniform resource identifier pointing towards the identified segment;

means for transmitting the determined uniform resource identifier to the player; or transmitting the segment pointed at by the determined uniform resource identifier to the player; and a computing machine, which implements at least one of the means for identifying, the means for determining, and/or the means for transmitting.

* * * * *

UNITED STATES PATENT AND TRADEMARK OFFICE
CERTIFICATE OF CORRECTION

| | | |
|---|---|---|
| PATENT NO. | : 9,710,473 B2 | Page 1 of 3 |
| APPLICATION NO. | : 14/281560 | |
| DATED | : July 18, 2017 | |
| INVENTOR(S) | : Macaulay et al. | |

It is certified that error appears in the above-identified patent and that said Letters Patent is hereby corrected as shown below:

In the Drawings

In Fig. 5, Sheet 5 of 17, for Step "5-2", in Line 1, delete "segment ID"""" and insert -- segment ID" --, therefor.

Please replace FIG. 11 with FIG. 11 as shown on the attached page.

In the Specification

In Column 3, Lines 60-61, delete "an splicer," and insert -- a splicer, --, therefor.

In Column 4, Line 6, delete "(or else" and insert -- or else --, therefor.

In Column 7, Line 2, delete "playlist list" and insert -- playlist --, therefor.

In Column 11, Lines 3-4, delete "information)." and insert -- information. --, therefor.

In Column 13, Line 44, delete "identifier" and insert -- identifier" --, therefor. (Third Occurrence)

In Column 13, Line 45, delete "identifier," and insert -- identifier), --, therefor.

In Column 15, Line 11, delete "determined" and insert -- determined. --, therefor.

In Column 18, Line 12, delete "(FIG. 9 and 10)" and insert -- (FIGS. 9 and 10) --, therefor.

In Column 20, Line 41, delete "(FIG. 11 and 12)" and insert -- (FIGS. 11 and 12) --, therefor.

In Column 23, Line 11, delete "("zone ID)" and insert -- ("zone ID") --, therefor.

In Column 26, Line 67, delete "76" and insert -- 76. --, therefor.

Signed and Sealed this
Twenty-eighth Day of August, 2018

Andrei Iancu
*Director of the United States Patent and Trademark Office*

CERTIFICATE OF CORRECTION (continued)
U.S. Pat. No. 9,710,473 B2

In Column 27, Line 8, delete "HTTP" and insert -- "HTTP --, therefor.

In Column 27, Line 40, delete ""asset+ID+ user ID+segment ID" as "alt ID>>," and insert -- "assetID+ user ID+segment ID" as "alt ID">>, --, therefor.

In Column 28, Line 54, delete "an splicer" and insert -- a splicer --, therefor.

In the Claims

In Column 30, Line 30, in Claim 3, delete "any one of the claim" and insert -- claim --, therefor.

In Column 30, Line 63, in Claim 5, delete "playlist list" and insert -- playlist --, therefor.

In Column 31, Line 24, in Claim 9, delete "watermark" and insert -- watermark, --, therefor.

In Column 31, Line 39, in Claim 10, delete "a the" and insert -- the --, therefor.

In Column 32, Line 13, in Claim 12, delete "act i)," and insert -- act i) --, therefor.

In Column 34, Line 54, in Claim 17, delete "computing" and insert -- a computing --, therefor.

In Column 34, Line 65, in Claim 18, delete "identifier:" and insert -- identifier; --, therefor.